(12) United States Patent
Tsao et al.

(10) Patent No.: US 11,372,779 B2
(45) Date of Patent: Jun. 28, 2022

(54) MEMORY CONTROLLER AND MEMORY PAGE MANAGEMENT METHOD

(71) Applicants: Industrial Technology Research Institute, Hsinchu (TW); National Taiwan University, Taipei (TW)

(72) Inventors: Che-Wei Tsao, Changhua County (TW); Tei-Wei Kuo, Taipei (TW); Yuan-Hao Chang, Taipei (TW); Tzu-Chieh Shen, Taipei (TW); Shau-Yin Tseng, Hsinchu County (TW)

(73) Assignees: Industrial Technology Research Institute, Hsinchu (TW); National Taiwan University, Taipei (TW)

( * ) Notice: Subject to any disclaimer, the term of this patent is extended or adjusted under 35 U.S.C. 154(b) by 229 days.

(21) Appl. No.: 16/425,969

(22) Filed: May 30, 2019

(65) Prior Publication Data

US 2020/0201782 A1    Jun. 25, 2020

(30) Foreign Application Priority Data

Dec. 19, 2018   (TW) .................................. 107145910

(51) Int. Cl.
*G06F 12/12*   (2016.01)
*G06F 12/123*   (2016.01)
*G06F 12/1027*   (2016.01)

(52) U.S. Cl.
CPC ........ *G06F 12/124* (2013.01); *G06F 12/1027* (2013.01); *G06F 12/123* (2013.01); *G06F 2212/684* (2013.01)

(58) Field of Classification Search
CPC .... G06F 12/0246; G06F 12/12; G06F 12/123; G06F 12/124; G06F 12/125; G06F 12/1027; G06F 2212/684
See application file for complete search history.

(56) References Cited

U.S. PATENT DOCUMENTS 6,385,699 B1 *   5/2002   Bozman ................ G06F 12/121
                                                         711/134
8,938,601 B2    1/2015    Lee et al.
(Continued)

FOREIGN PATENT DOCUMENTS

CN          106469119        3/2017
TW          I567551          1/2017
(Continued)

OTHER PUBLICATIONS

PIPP: Promotion/Insertion Pseudo-Partitioning of Multi-Core Shared Caches by Xie (Year: 2009).*
(Continued)

*Primary Examiner* — Paul M Knight
(74) *Attorney, Agent, or Firm* — JCIPRNET

(57) ABSTRACT

A memory page management method is provided. The method includes receiving a state-change notification corresponding to a state-change page, and grouping the state-change page from a list to which the state-change page belongs into a keep list or an adaptive LRU list of an adaptive adjusting list according to the state-change notification; receiving an access command from a CPU to perform an access operation to target page data corresponding to a target page; determining that a cache hit state is a hit state or a miss state according to a target NVM page address corresponding to the target page, and grouping the target page into the adaptive LRU list according to the cache hit state; and searching the adaptive page list according to the target NVM page address to obtain a target DRAM page address to complete the access command corresponding to the target page data.

20 Claims, 13 Drawing Sheets

(56) References Cited

U.S. PATENT DOCUMENTS

| | | | |
|---|---|---|---|
| 8,977,806 | B1 | 3/2015 | Rosenband et al. |
| 9,348,539 | B1 | 5/2016 | Saxena et al. |
| 9,529,708 | B2 | 12/2016 | Puthiyedath et al. |
| 10,810,123 | B1* | 10/2020 | Xu .................. G06F 12/0246 |
| 2007/0118695 | A1* | 5/2007 | Lowe ................ G06F 12/127 711/E12.072 |
| 2009/0193184 | A1 | 7/2009 | Yu et al. |
| 2013/0117497 | A1* | 5/2013 | Cui .................... G06F 3/067 711/103 |
| 2013/0332660 | A1 | 12/2013 | Talagala et al. |
| 2014/0297919 | A1 | 10/2014 | Nachimuthu et al. |
| 2015/0234669 | A1* | 8/2015 | Ben-Yehuda ........ G06F 3/065 718/1 |
| 2016/0239685 | A1 | 8/2016 | Li et al. |
| 2017/0024326 | A1* | 1/2017 | Luo ................. G06F 12/1009 |
| 2017/0139649 | A1 | 5/2017 | Puthiyedath et al. |
| 2017/0293566 | A1* | 10/2017 | Feng ................ G06F 12/0246 |
| 2018/0089107 | A1* | 3/2018 | Yan .................. G06F 12/0862 |
| 2018/0232310 | A1 | 8/2018 | Chang et al. |
| 2019/0332535 | A1* | 10/2019 | Gupta ................. G06F 3/061 |
| 2019/0391923 | A1* | 12/2019 | Gupta ............... G06F 12/0891 |
| 2019/0391932 | A1* | 12/2019 | Gupta ............... G06F 12/123 |
| 2020/0151104 | A1* | 5/2020 | Yang ................ G06F 13/1668 |

FOREIGN PATENT DOCUMENTS

| | | |
|---|---|---|
| TW | I596541 | 8/2017 |
| TW | 201740278 | 11/2017 |
| TW | 201805811 | 2/2018 |
| TW | 201841119 | 11/2018 |

OTHER PUBLICATIONS

HAP: Hybrid-Memory-Aware Partition in Shared Last-Level Cache by Wei (Year: 2017).*

Efficient Page Caching Algorithm with Prediction and Migration for a Hybrid Main Memory by Seok (Year: 2011).*

LIRS: An Efficient Low Interference Recency Set Replacement Policy to Improve Buffer Cache Performance by Jiang (Year: 2002).*

Better active/inactive list balancing by Corbet (Year: 2012).*

"Office Action of Taiwan Counterpart Application," dated Jun. 27, 2019, p. 1-p. 5.

Yunjoo Park et al., "Management of Virtual memory Systems under high Performance PCM-based Swap Devices," 2015 IEEE 39th Annual Computer Software and Applications Conference., vol. 2, Jul. 2015, pp. 764-772.

Seunghoon Yoo; et al., "An efficient page replacement algorithm for PCM-based mobile embedded systems," 2016 17th IEEE/ACIS International Conference on Software Engineering, Artificial Intelligence, Networking and Parallel/Distributed Computing (SNPD), May 30-Jun. 1, 2016, pp. 183-188.

Hyejeong Lee et al., "Characterizing virtual memory write references for efficient p. replacement in NAND flash memory, " 2009 IEEE International Symposium on Modeling, Analysis & Simulation of Computer and Telecommunication Systems, Sep. 2009 pp. 1-10.

Kazuichi Oe et al., "Feasibility Study for Building Hybrid Storage System Consisting of Non-volatile DIMM and SSD," 2016 Fourth International Symposium on Computing and Networking (CANDAR), Nov. 2016, pp. 454-457.

Zhengguo Chen et al., "TBuffer: Constructing a Tail Buffer in DRAM for Flash-based Main Memory System," 2016 EEE 18th International Conference on High Performance Computing and Communications; IEEE 14th International Conference on Smart City; IEEE 2nd International Conference on Data Science and Systems , Dec. 2016, pp. 276-283.

Renhai Chen et al., "Bridging the I/O performance gap for big data workloads: A new NVDIMM-based approach," 2016 49th Annual IEEE/ACM International Symposium on Microarchitecture (MICRO), Oct. 2016, pp. 1-12.

Jun Yang et al., "NV-Tree: A Consistent and Workload-Adaptive Tree Structure for Non-Volatile Memory," IEEE Transaction on Computers, vol. 65, Issue 7, Jul. 2017, pp. 2169-2183.

Qingsong Wei et al., "Accelerating Cloud Storage System with Byte-Addressable Non-Volatile Memory," 2015 IEEE 21st International conference on Parallel and Distributed Systems (ICPADS), Dec. 2015, pp. 354-361.

Ju-Young Jung et al., "Empirical, Analytical Study of Hardware-Based page Swap in Hybrid Main Memory System," 2016 IEEE 28th International Symposium on Computer Architecture and High Performance Computing, Oct. 2016, pp. 101-108.

* cited by examiner

MEMORY CONTROLLER AND MEMORY PAGE MANAGEMENT METHOD

CROSS-REFERENCE TO RELATED APPLICATION

This application claims the priority benefit of Taiwan application no. 107145910, filed on Dec. 19, 2018. The entirety of the above-mentioned patent application is hereby incorporated by reference herein and made a part of this specification.

TECHNICAL FIELD

The disclosure relates to a memory controller, and more particularly, relates to a memory controller and a memory page management method for a non-volatile dual in-line memory Module (NVDIMM) device.

BACKGROUND

With the evolution of technology, the demand for main memory (such as a dynamic random access memory, DRAM) is increasing in electronic devices such as servers, personal computers, and mobile phones.

However, because the DRAM will lose stored data when being powered off, the electronic device often needs to back up the data stored in the DRAM to a non-volatile memory (NVM) device (e.g., a hard disk or a solid state drive), which will not lose the data when being powered off. Consequently, a large amount of access operations is required and working efficiency of the electronic device is reduced. On the other hand, in order to execute the application efficiently, the electronic device needs to load in relevant data from the non-volatile memory device to the main memory so as to speed up the operating speed of the application with the high-speed computing performance of the main memory. Accordingly, a large amount of access operations is also generated when the electronic device is in operation.

For the problems described above, currently, a common solution attempts to develop an NVDIMM device with quick access feature of the DRAM and "no data loss when being powered off" feature of the MVM by combining the DRAM and the NVM in a dual in-line memory module (DIMM) device.

However, at present, because the management performance in memory page cache is very low and costly, the NVDIMM device fails to fully utilize the quick access feature of the DRAM so it is difficult to replace the DRAM-based main memory by the NVDIMM.

Therefore, how to improve the efficiency of the memory page management for the NVDIMM device while reducing the management cost in the operation of the NVDIMM device is the goal to be achieved by persons skilled in the art.

SUMMARY

The disclosure is directed to a memory controller and a memory page management method, which can significantly improve the operating efficiency of the NVDIMM device with minimal management cost.

An embodiment of the disclosure provides a memory controller for controlling a non-volatile dual In-line memory module (NVDIMM) device of a host system. The NVDIMM device includes the memory controller, a dynamic random access memory (DRAM) and a non-volatile memory module (NVM). The DRAM has a plurality of DRAM pages, and the NVM has a plurality of NVM pages. The memory controller includes an NVDIMM interface, a static random access memory (SRAM) and a processor. The NVDIMM interface is configured to be coupled to a central processing unit (CPU) of the host system. The central processing unit is configured to access the NVM pages of the NVM and execute an operating system of the host system. The static random access memory (SRAM) is configured to store data. The processor is coupled to the DRAM, the NVM, the NVDIMM interface and the SRAM. The processor is configured to access and execute a memory page management module stored in the NVM that carry out a memory page management method. The memory page management module is configured to receive a state-change notification corresponding to a state-change page from the central processing unit, and group the state-change page from a list to which the state-change page currently belongs into a keep list or an adaptive least recently used (LRU) list of an adaptive adjusting list according to the state-change notification. The state-change notification is configured to indicate that a state of the state-change page is changed to an active state or an inactive state by the operating system. In addition, the memory page management module is further configured to receive an access command from the central processing unit. The access command instructs an access operation to be performed to target page data corresponding to a target page. The memory page management module is further configured to identify the target page and a target NVM page address corresponding to the target page according to the access command. In response to determining that a cache hit state corresponding to the target page is a hit state, the memory page management module is further configured to identify a target DRAM page address mapped to the target NVM page address. In response to the target page being grouped into a lazy list of the adaptive LRU list, the memory page management module is further configured to group the target page into a first in first out (FIFO) list of the adaptive LRU list. In response to determining that the cache hit state corresponding to the target page is a miss state, the memory page management module is further configured to store target page data corresponding to the target NVM page into the DRAM page of the DRAM, map the target DRAM page address of the target DRAM page to the target NVM page address, and group the target page into the adaptive LRU list. The memory page management module is further configured to complete the access operation corresponding to the target page data by using the target DRAM page address according to the access command.

An embodiment of the disclosure further provides a memory page management method, which is adapted for controlling a memory controller of a non-volatile dual In-line memory module (NVDIMM) device of a host system. The NVDIMM device includes the memory controller, a dynamic random access memory (DRAM) and a non-volatile memory module (NVM). The DRAM has a plurality of DRAM pages, and the NVM has a plurality of NVM pages. The memory page management method includes: receiving a state-change notification corresponding to a state-change page from a central processing unit, and grouping the state-change page from a list to which the state-change page currently belongs into a keep list or an adaptive least recently used (LRU) list of an adaptive adjusting list according to the state-change notification, wherein the central processing unit executes an operating system of the host system, wherein the state-change notification is configured to indicate that a state of the state-change page is changed to an active state or an inactive state by the operating system;

receiving an access command from the central processing unit, wherein the access command instructs an access operation to be performed to target page data corresponding to a target page; identifying the target page and a target NVM page address corresponding to the target page according to the access command; determining that a cache hit state corresponding to the target page is a hit state or a miss state according to the target NVM page address, in response to determining that a cache hit state corresponding to the target page is a hit state, identifying a target DRAM page address mapped to the target NVM page address, and in response to the target page being grouped into a lazy list of the adaptive LRU list, further grouping the target page into a first in first out (FIFO) list of the adaptive LRU list; and in response to determining that the cache hit state corresponding to the target page is a miss state, storing the target page data corresponding to the target page into the target DRAM page of the DRAM, mapping the target DRAM page address of the target DRAM page to the target NVM page address, and grouping the target page into the adaptive LRU list; and completing the access operation corresponding to the target page data by using the target DRAM page address according to the access command.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

Figure 1:
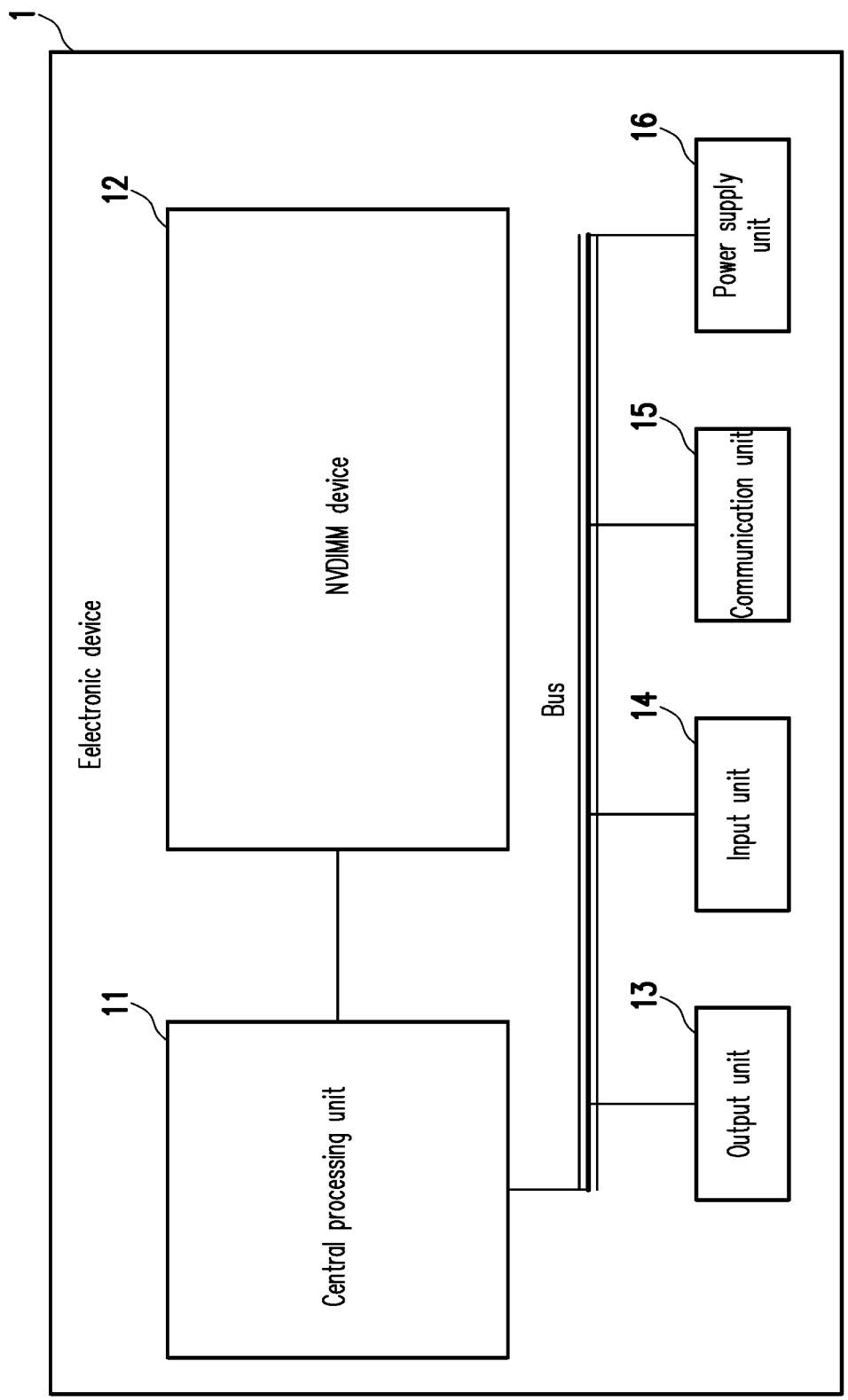
FIG. 1 is a schematic block diagram illustrating an electronic device that uses the NVDIMM as the main memory according to an embodiment of the disclosure.

In the following detailed description, for purposes of explanation, numerous specific details are set forth in order to provide a thorough understanding of the disclosed embodiments.

It will be apparent, however, that one or more embodiments may be practiced without these specific details. In other instances, well-known structures and devices are schematically shown in order to simplify the drawing.

FIG. 1 is a schematic block diagram illustrating an electronic device that uses the NVDIMM as the main memory according to an embodiment of the disclosure.

With reference to FIG. 1, in this embodiment, an electronic device 1 includes a central processing unit 11, a non-volatile dual in-line memory module (NVDIMM) device 12 (referred to as the NVDIMM device 120 hereinafter), an output unit 13, an input unit 14, a communication unit 15 and a power supply unit 16. The central processing unit (CPU) 11 is coupled to the NVDIMM device 12, and the central processing unit 11 is connected to the output unit 13, the input unit 14, the communication unit 15 and the power supply unit 16 via a bus. The electronic device 1 is, for example, a server, a personal computer, a notebook computer, a tablet computer, a cell phone, etc., but the disclosure is not limited to the type of the electronic device 1 as mentioned above.

In this embodiment, the central processing unit 11 is configured to execute an operating system of the electronic device 1 so as to manage overall interaction and operation of each element in the electronic device 1. The central processing unit 11 sends commands via the bus to control the output unit 13, the input unit 14, the communication unit 15 and the power supply unit 16. In addition, the central processing unit 11 further utilizes the NVDIMM device 12 to access data. In this embodiment, the NVDIMM device 12 is a main memory of the electronic device 1. In an embodiment, the NVDIMM device 12 serves as both the main memory and a main data storage device of the electronic device 1.

In other embodiments, the central processing unit 11 may also be replaced by other processors, such as a microprocessor, other programmable microprocessors, a digital signal processor (DSP), a programmable controller, an application specific integrated circuits (ASIC), a programmable logic device (PLD) or other similar devices.

The output unit 13 is configured to receive instructions of the central processing unit 11 to output image and/or audio. The output unit 13 includes a circuit element like an audio output circuit, a display circuit, a display card, etc., which may be coupled to the corresponding signal output device (e.g., the audio output circuit is coupled to a speaker; the display card is coupled to a screen).

The input unit 14 is configured to receive an input operation of a user to generate the corresponding data and signal for the central processing unit 11 so the user can control the electronic device 1 through the input operation. The input unit 14 includes a circuit element or an interface for coupling to input devices like a keyboard, a mouse, a touch, etc.

The communication unit 15 is configured to transmit or receive data by ways of a wireless communication or a wired communication. For example, the communication unit 15 is a communication circuit unit that supports one of wireless communication protocols like wireless fidelity (WiFi) system, Bluetooth, etc., or a combination thereof. As another example, the communication unit 15 may be a network interface card (NIC) that supports the wired communication.

The power supply unit 16 is, for example, a power supply, which is configured to receive an external power (e.g., a supply mains) for providing electric power required by the electronic device 1 in operation. The power supply unit 16 may also include a battery for providing electric power to the electronic device 1 without receiving the external power.

As described above, the NVDIMM device 12 may serve as the main memory the electronic device 1 for temporarily storing data. In addition, the NVDIMM device 12 may serve as the main storage device of the electronic device, which is configured to store data that needs to be stored for a long period of time (e.g., system data such as software and firmware for managing the electronic device, and user data). Detailed configuration of the NVDIMM device 12 is described below with reference to FIG. 2A.

Figure 2A:
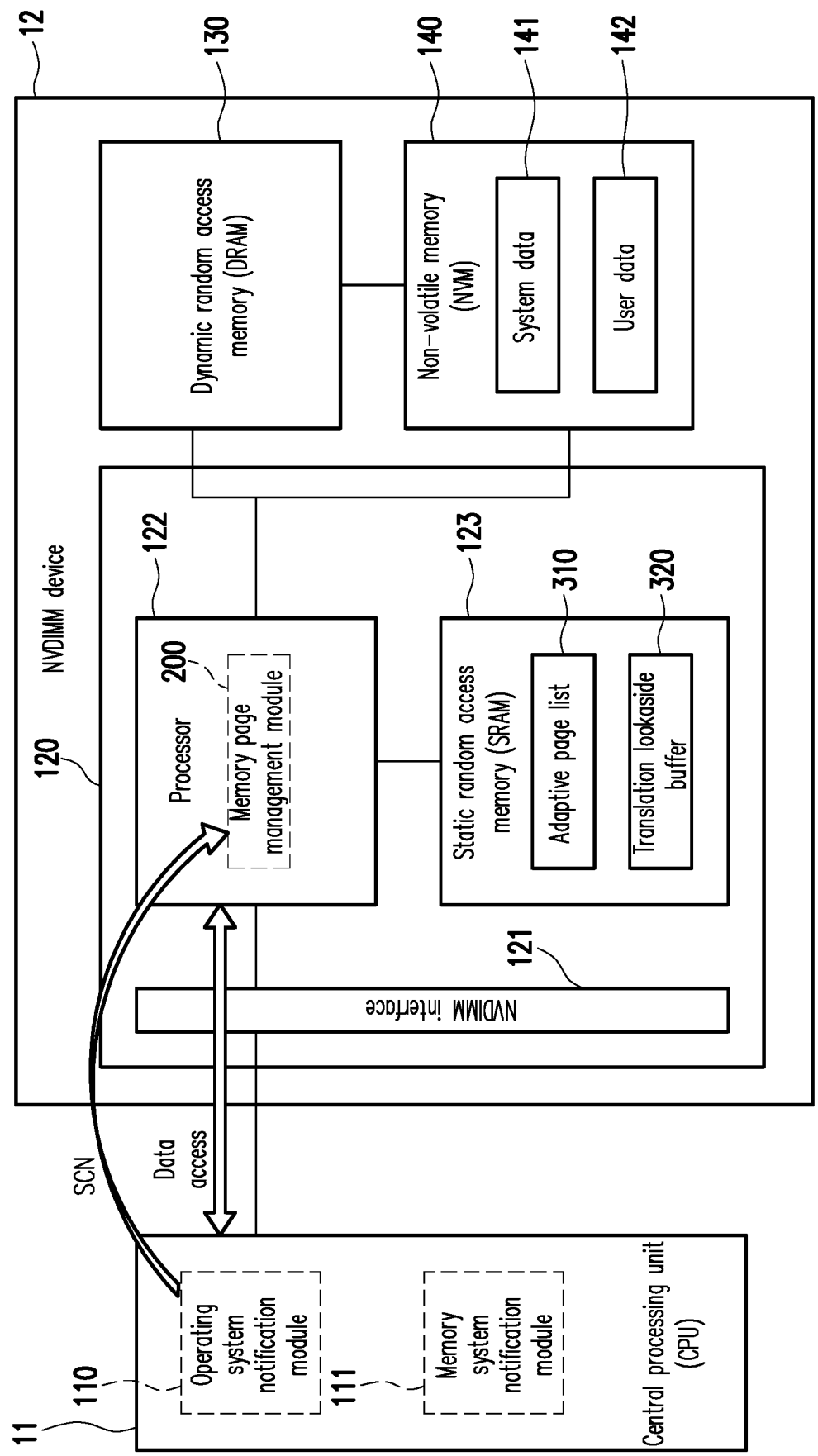
FIG. 2A is a schematic block diagram illustrating an NVDIMM device according to an embodiment of the disclosure.

FIG. 2A is a schematic block diagram illustrating a measurement data management device according to an embodiment of the disclosure. With reference to FIG. 2A, in this embodiment, the NVDIMM device 12 includes an NVDIMM controller 120, a dynamic random access memory (DRAM) 130 and a non-volatile memory (NVM) 140. The DRAM 130 has a plurality of physical memory pages (referred to as DRAM pages hereinafter) for storing data.

The NVM 140 is, for example, a flash memory, an electrically erasable programmable read only memory (EEPROM), an erasable programmable read only memory (EPROM), a magnetoresistive random access memory (MRAM) or a resistive random access memory (RRAM). In this embodiment, the NVM 140 is configured to store system data 141 and user data 142. The system data 141 is, for example, software or firmware for managing the electronic device 1 or the NVDIMM device 12 (including a memory page management module 200). The user data 142 is, for example, data stored in the NVDIMM device 12 by the user of the electronic device 1 (e.g., audio data, image data, or text data) or applications installed on the electronic device 1 by the user (e.g., an operating system, or APPs). The NVM 140 has a plurality of physical memory pages (also referred to as NVM pages) for storing data.

Figure 2B:
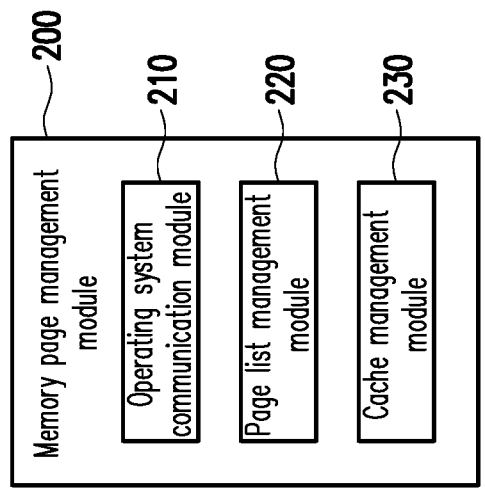
FIG. 2B is a schematic block diagram illustrating a memory page management module according to an embodiment of the disclosure.

FIG. 2B is a schematic block diagram illustrating a memory page management module according to an embodiment of the disclosure. With reference to FIG. 2B, in an embodiment, the memory page management module 200 includes an operating system communication module 210, a page list management module 220, and a cache management module 230. In this embodiment, a processor 122 loads in the memory page management module 200 from the NVM 140 and executes the memory page management module 200 to run a memory page management procedure so as to carry out a memory page management method. Detailed operation of each element in the memory page management module 200 is described below with various drawings.

The NVDIMM controller 120 is configured to manage the NVDIMM device 12. The NVDIMM controller 120 includes an NVDIMM interface 121, the processor 122 and a static random access memory (SRAM) 123. Operation of each element in the NVDIMM controller 120 may be regarded as overall operation of the NVDIMM controller 120.

The processor 122 is hardware with computing capability (e.g., a chipset or a processor), and the processor 122 is a core element of the NVDIMM controller 120. In this embodiment, the processor 122 is, for example, a central processing unit (CPU) of single-core or multi-core, a microprocessor, other programmable microprocessors, a digital signal processor (DSP), a programmable controller, an application specific integrated circuits (ASIC), a programmable logic device (PLD) or other similar devices.

The NVDIMM interface 121 is configured to couple to the central processing unit 11. That is to say, the processor 122 can receive data or commands from the central processing unit 11 or transmit commands or data to the central processing unit 11 via the NVDIMM interface.

In this embodiment, the SRAM 123 is configured to receive instructions of the processor 122 and temporarily store data. The SRAM 123 may be used to store an adaptive adjusting list 310 and a translation lookaside buffer (TLB) 320. The adaptive adjusting list 310 is used to record a mapping relation of a DRAM page address and an NVM page address.

Figure 3:
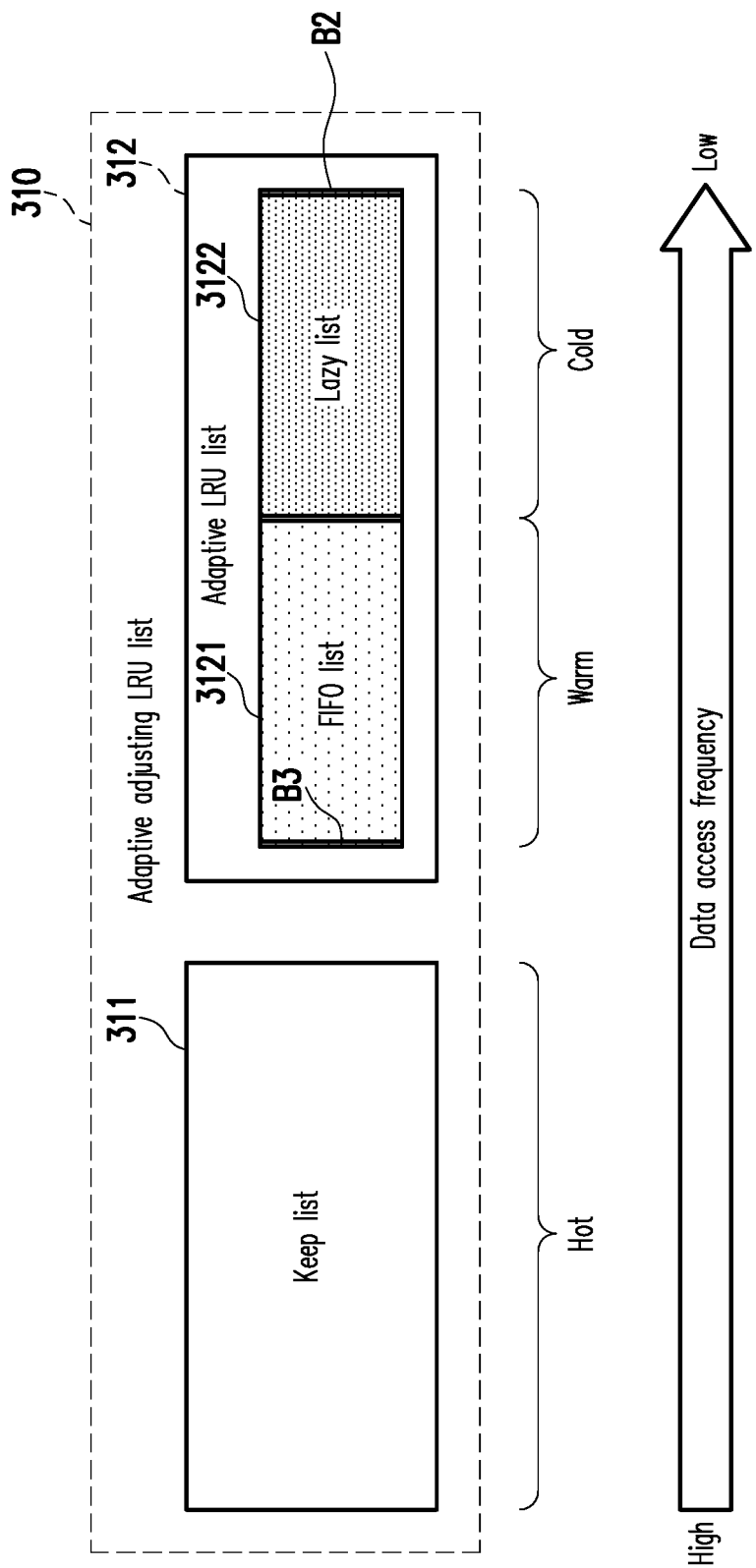
FIG. 3 is a schematic diagram illustrating an adaptive adjusting list according to an embodiment of the disclosure.

FIG. 3 is a schematic diagram illustrating an adaptive adjusting list according to an embodiment of the disclosure. With reference to FIG. 3, the adaptive adjusting list 310 includes a keep list 311, an adaptive least recently used list (referred to as the adaptive LRU list hereinafter) 312. The adaptive LRU list 312 includes a first in first out (FIFO) list (referred to as the FIFO list hereinafter) 3121 and a lazy list 3122. A border B3 is used to indicate a front end of the adaptive LRU list 312; a border B2 is used to indicate a back end of the adaptive LRU list 312; and a border B1 is used to indicate a boundary between the FIFO list 3121 and the lazy list 3122 in the adaptive LRU list 312. In other words, the FIFO list 3121 is arranged in front the lazy list 3122. The processor 122 (or the memory page management module 200) may use corresponding indicators to mark/set memory addresses of the borders B1 to B3 in the SRAM 123, so as to set a length and a space for the FIFO list 3121 and the lazy list 3122. That is to say, the processor 122 may change sizes of the FIFO list 3121 and the lazy list 3122 by changing positions of the borders B1 to B3. In this embodiment, a size and a memory address of the keep list 311 may be set in advance.

In this embodiment, the adaptive LRU list 312 is used to record a plurality of entries corresponding to the NVM pages. Each entry among the entries may record the NVM page address corresponding to the NVM page and the DRAM page address corresponding to the DRAM page. Here, the DRAM page is set to be mapped to the NVM page so as to temporarily store data corresponding to the NVM page. That is to say, the DRAM page may temporarily store data to be written into the mapped NVM page or may temporarily store data read from the mapped NVM page. In other words, each entry records the NVM page address and the DRAM page address mapped to the NVM page.

Moreover, in an embodiment, each entry among the entries further records attribute information of the corresponding NVM page and attribute information of the corresponding DRAM page.

In this embodiment, for the NVM page mapped to one DRAM page, the processor 122 (or the memory page management module 200) may group that NVM page into one of the keep list 311, the FIFO list 3121 or the lazy list 3122 according to a data access frequency corresponding to the NVM page.

As shown by FIG. 3, data stored in a memory page with high data access frequency may be regarded as hot data, and the memory page for storing the hot data may be grouped into the keep list 311 by the processor 122 (or the memory page management module 200); data stored in a memory page with low data access frequency may be regarded as cold data, and the memory page for storing the cold data may be grouped into the lazy list 3122; data stored in a memory page with moderate data access frequency may be regarded as warm data, and the memory page for storing the warm data may be grouped into the FIFO list 3121.

It is worth noting that, in this embodiment, only when one NVM page is being grouped into the FIFO list 3121 by the processor 122 (or the memory page management module 200), the processor 122 (or the memory page management module 200) can determine to arrange said one NVM page at a front end of the FIFO list 3121 (i.e., arrange that NVM page as the first FIFO page in the FIFO list 3121) or a back end of the FIFO list 3121 (i.e., arranged that NVM page as the last FIFO page in the FIFO list 3121); and only when grouping one NVM page into the lazy list 3122, the processor 122 (or the memory page management module 200) can determine to arrange said one NVM page at a front end of the lazy list 3122 (i.e., arrange that NVM page as the first lazy page in the lazy list 3122) or a back end of the lazy list 3122 (i.e., arranged that NVM page as the last lazy page in the lazy list 3122). Other than that, at other time points, the processor 122 (or the memory page management module 200) does not adjust an arrangement order of the NVM pages being grouped into the keep list 311 (a.k.a. a plurality of keep pages), does not adjust an arrangement order of the NVM pages being grouped into the FIFO list 3121 (a.k.a. a plurality of FIFO pages), and does not adjust an arrangement order of the NVM pages being grouped into the lazy list 3122 (a.k.a. a plurality of lazy pages). In this way, the memory page management procedure/the memory page management method provided by the disclosure can limit (reduce) massive time and computing resource consumption caused by adjusting the arrangement orders of the memory pages being grouped into the adaptive adjusting list.

Operations and functions of the memory page management module 200 and the corresponding memory page management method are described below with reference to various drawings and embodiments.

Figure 4A:
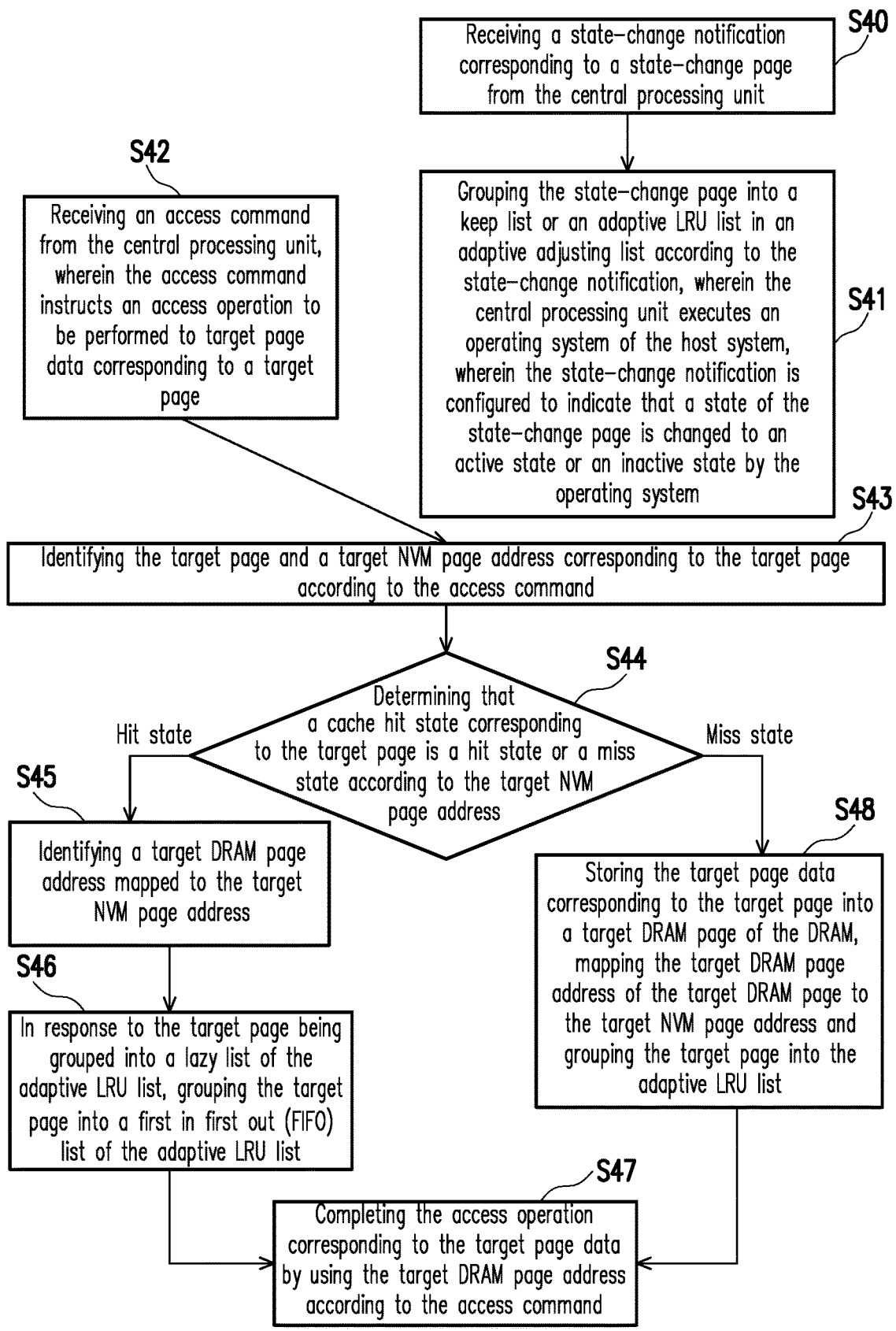
FIG. 4A is a flowchart illustrating a memory page management method according to an embodiment of the disclosure.

FIG. 4A is a flowchart illustrating a memory page management method according to an embodiment of the disclosure. With reference to FIG. 4A, in response to a state-change notification being received (step S40) and an access command being received (step S42), the memory page management module 200 will execute different subsequent step correspondingly. First of all, the case where the state-change notification is received (step S40) and the subsequent steps are described as follows. In step S40, the memory page management module 200 receives a state-change notification corresponding to a state-change page from the central processing unit. Next, in step S41, the memory page management module 200 groups the state-change page from a list to which the state-change page currently belongs into a keep list or an adaptive LRU list of an adaptive adjusting list according to the state-change notification, wherein the state-change notification is configured to indicate that a state of the state-change page is changed to an active state or an inactive state by the central processing unit.

Specifically, a main spirit of the memory page management method provided by the embodiment is to: monitor a memory page state-change event occurring in the operating system executed by the electronic device 1 and send a corresponding notification (i.e., the state-change notification) according to the memory page state-change event to the memory page management module 200, so as to group the memory pages cached in the DRAM according to the notification. In this way, the notification corresponding to the memory page state-change event can be used very efficiently to accurately handle the significance of the memory page corresponding to the memory page state-change event, and can then be applied for grouping of the memory pages in the adaptive adjusting list (i.e., grouping the state-change page into the keep list or the adaptive LRU list of the adaptive adjusting list according to the state-change notification).

More specifically, before the operation of receiving the state-change notification corresponding to the state-change page, the memory page management module 200 (or the operating system communication module 210) performs a memory initialization operation corresponding to the NVDIMM device 12 to install an operating system notification module 110 to the operating system, wherein the central processing unit 11 executes the operating system notification module 110 so that the operating system notification module 110 can monitor the memory page state-change event occurring in the operating system and send the corresponding notification (i.e., the state-change notification) to the operating system communication module 210. The memory page state-change event can be distinguished as an active event and an inactive event. When the central processing unit 11 (or the operating system) sets a state of one memory page (a.k.a. the state-change page) to an active state, it means that the active event corresponding to that memory page has occurred; when the central processing unit 11 (or the operating system) sets the state of one memory page to an inactive state, it means that the inactive event corresponding to that memory page has occurred.

The operating system notification module 110 is configured to send the state-change notification to the memory page management module. The state-change notification includes a promotion notification and a demotion notification. When the central processing unit 11 (the operating system) changes the state of the state-change page to the active state (i.e., the active event corresponding to the state-change page has occurred), the operating system notification module 110 sends the promotion notification to the memory page management module 200 (or the operating system communication module 210). When the central processing unit 11 (the operating system) changes the state of the state-change page to the inactive state (i.e., the inactive event corresponding to the state-change page has occurred), the operating system notification module 110 sends the demotion notification to the memory page management module 200 (or the operating system communication module 210).

Figure 5:
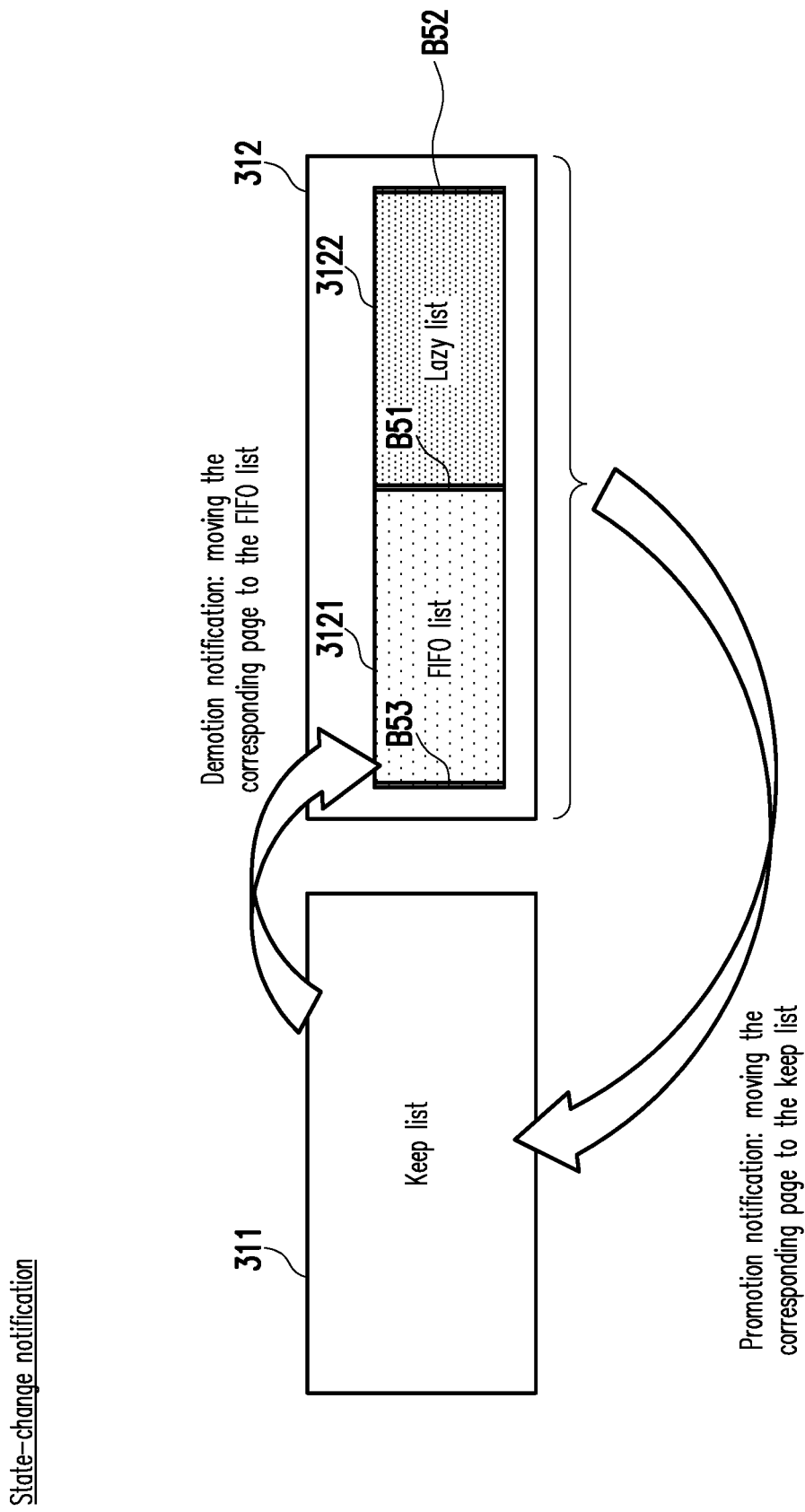
FIG. 5 is a schematic diagram illustrating a list adjustment corresponding to the state-change notification according to an embodiment of the disclosure.

FIG. 5 is a schematic diagram illustrating a list adjustment corresponding to the state-change notification according to an embodiment of the disclosure. With reference to FIG. 5, in this embodiment, when the memory page management module 200 (or the operating system communication module 210) receives the demotion notification corresponding to the state-change page, the memory page management module 200 (or the page list management module 220) groups the state-change page being grouped into the keep list 311 into the front end of the FIFO list 3121. In other words, the state-change page will no longer be grouped in the keep list 311 when the demotion notification for the state-change page being grouped into the keep list 311 is received, and instead, the state-change page is grouped into and arranged at forefront of the FIFO list 3121. If the state-change page corresponding to the received demotion notification is not being grouped into the keep list 311, the memory page management module 200 (or the page list management module 220) does not change the list to which state-change page currently belongs. If the state-change page corresponding to the received demotion notification is not being grouped into the keep list 311 and is not being grouped into the adaptive LRU list 312, the memory page management module 200 (or the page list management module 220) does not group the state-change page into the adaptive LRU list 312.

On the other hand, when the memory page management module 200 (or the operating system communication module 210) receives the promotion notification corresponding to the state-change page, the memory page management module 200 (or the operating system communication module 210) groups the state-change page not being grouped into the keep list 311 into the keep list 311 (without setting the arrangement order of the state-change page in the keep list 311). In other words, when the promotion notification for the state-change page is received, if the state-change page is not being grouped into the keep list 311 (e.g., already being grouped into the adaptive LRU list 312 or not being cached in the DRAM 130), the memory page management module 200 (or the page list management module 220) groups the state-change page into the keep list 311 (the state-change page not being cached in the DRAM 130 will be cached to the DRAM 130). Steps S40 and S41 are executed independently in parallel (as compared to other steps, such as steps S42 to S48). That is to say, each time when the memory page management module 200 (or the operating system communication module 210) receives the state-change notification, the memory page management module 200 (or the page list management module 220) determines whether to adjust the list to which the state-change notification belongs according to the corresponding list to which the state-change notification belongs. In addition, the NVM page being grouped into the keep list 311 can only be removed from the keep list 311 based on the received corresponding demotion notification. In other words, in the case where the corresponding demotion notification is not received, the NVM page in the keep list 311 will be continuously kept at the state of being cached in the DRAM 130. In contrast, the NVM pages being grouped into the lazy list 3122 have a certain probability of being removed. In other words, it is possible that the NVM page in the lazy list 3122 does not continue to be cached in the DRAM 130.

On the other hand, in step S42, the memory page management module 200 receives an access command from the central processing unit, wherein the access command instructs an access operation to be performed to target page data corresponding to a target page. Specifically, when the central processing unit 11 intends to perform a memory access operation for accessing the main memory, the central processing unit 11 sends the access command (including the corresponding NVM page address) to the processor 122 via a memory management module 111, so as to perform the memory access operation to the NVDIMM device 12 (i.e., perform the memory access operation to the target page data corresponding to the NVM page). The DRAM pages are not seen/used by the central processing unit 11. That is to say, the central processing unit 11 can only send the access command corresponding to the NVM page to perform a memory page access operation to the NVM page.

For example, when the central processing unit 11 intends to write data (a.k.a. the target page data) into one NVM page, the central processing unit 11 sends the access command corresponding to a memory write operation to instruct the processor 122 (the memory page management module 200) to write the data into that NVM page (a.k.a. the target page). As another example, when the central processing unit 11 intends to read data (a.k.a. the target page data) from one NVM page, the central processing unit 11 sends the access command corresponding to the memory read operation to instruct the processor 122 to read the data from that NVM page (a.k.a. the target page).

Next, in step S43, the memory page management module 200 (or the page list management module 220) identifies the target page and a target NVM page address corresponding to the target page according to the access command. Specifically, the access command may include information for identifying the target page (the target NVM page address or a page identification code of the target page), and the memory page management module 200 (or the page list management module 220) may identify the target NVM page address according to said information.

After the target NVM page address corresponding to the target page is identified, in step S44, the memory page management module 200 (or the cache management module 230) may determine that a cache hit state corresponding to the target page is a hit state or a miss state according to the target NVM page address. Step S45 is executed subsequently in response to determining that the cache hit state is the hit state; step S48 is executed subsequently in response to determining that the cache hit state is the miss state. Details regarding steps S44 and S45 are described below with reference to FIG. 4B.

Figure 4B:
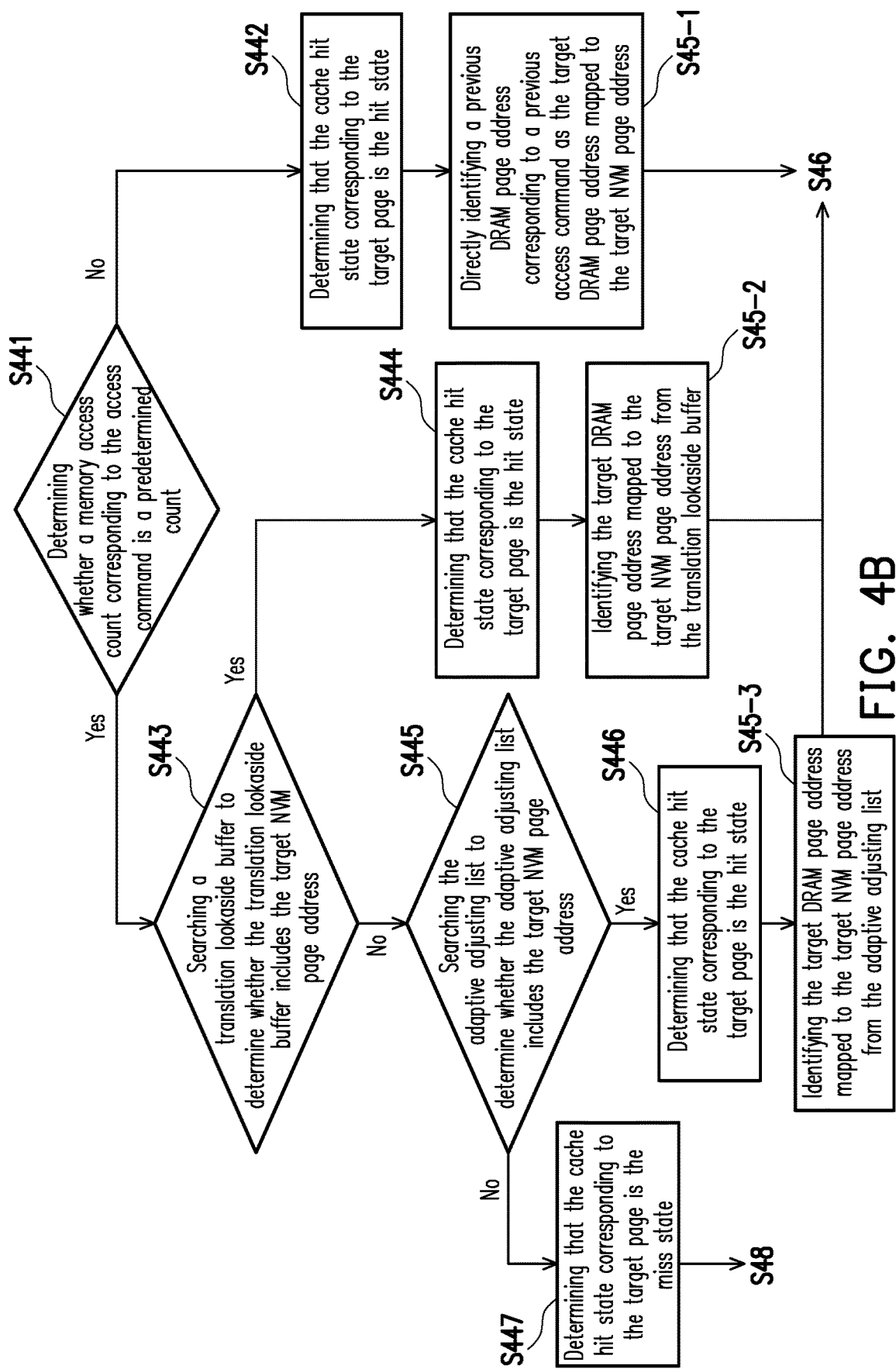
FIG. 4B is a flowchart illustrating steps S44 and S45 of FIG. 4A according to an embodiment of the disclosure.

FIG. 4B is a flowchart illustrating steps S44 and S45 of FIG. 4A according to an embodiment of the disclosure. Referring to FIG. 4B, step S44 includes steps S441 to S447, and step S45 includes steps S45-1, S45-2 and S45-3.

In this embodiment, in step S441, the memory page management module 200 (or the cache management module 230) determines whether a memory access count corresponding to the access command is a predetermined count. Specifically, the access command sent by the central processing unit 11 follows a rule that the transmitted access command corresponds to a cache line. The cache line has M access commands, wherein the target page corresponding to the M access commands corresponding to the same cache line are the same memory page. M is a predetermined positive integer. Based on such rule, each time when the memory page management module 200 (or the cache management module 230) processes one access command, the memory page management module 200 (or the cache management module 230) accumulates one memory access count in a round-robin manner, so as to determine whether the successively received access commands belong to the same cache line/target page.

For example, it is assumed that M is 8. The memory page management module 200 (or the cache management module 230) accumulates one memory access count to be "0, 1, 2, 3, 4, 5, 6 or 7" in the round-robin manner. That is to say, when the first access command of one cache line is received by the memory page management module 200 (or the cache management module 230), the memory access count may be accumulated to be "0". Next, when the second access command of that cache line is received by the memory page management module 200 (or the cache management module 230), the memory access count may be accumulated to be "1". By analogy, when the last access command of that cache line is received by the memory page management module 200 (or the cache management module 230), the memory access count may be accumulated to be "7". Then, when the first access command of another cache line is received by the memory page management module 200 (or the cache management module 230), the corresponding memory access count may be accumulated to be "0" again. This "0" is also referred to as a preset count.

In other words, when the memory access count corresponding to one access command is accumulated to be those not being "0" (e.g., one of 1 to 7), the memory page management module 200 (or the cache management module 230) can learn that the access command is the old cache line. That is to say, this access command corresponds to the target page corresponding to a previous access command, and this access command corresponds to the target NVM page address of the target page corresponding to the previous access command. In other words, the memory page management module 200 (or the cache management module 230) may directly use a DRAM page address mapped to a previously searched target NVM page address (a.k.a. a previous DRAM page address) as a DRAM address mapped to the target NVM page address corresponding to a current access command (a.k.a. a target DRAM page address). Accordingly, the memory page management module 200 (or the cache management module 230) does not need to re-search the target NVM page address corresponding to the current access command so that a massive amount of time can be saved. In addition, since the previous access command and the current access command correspond to the same target page, so that data of the target page already be cached in the DRAM 130 when the previous access command is processed. That is to say, the memory page management module 200 (or the cache management module 230) can directly determine that cache hit state of the target page of the current access command is the hit state (because the corresponding data is already cached in the DRAM 130).

On the other hand, when the memory access count corresponding to one access command is accumulated to be "0", the memory page management module 200 (or the cache management module 230) can learn that the access command is a new cache line. In other words, the memory page management module 200 (or the cache management module 230) cannot directly use the previously searched target NVM page address as the target NVM page address corresponding to the current access command. It is worth noting that, the memory access count and the predetermined count are set in advance according to a specification of the cache line of the memory access operation performed by the central processing unit 11.

As described above, in step 441, if the memory page management module 200 (or the cache management module 230) determines that the memory access count is not the predetermined count, the process proceeds to step S442, in which the memory page management module 200 (or the cache management module 230) determines that the cache hit state corresponding to the target page is the hit state. Next, in step S45-1, the memory page management module 200 (or the cache management module 230) directly identifies a previous DRAM page address corresponding to the previous access command as the target DRAM page address mapped to the target NVM page address. The target DRAM page address searched each time is independently marked or recorded.

Conversely, in step S441, if the memory page management module 200 (or the cache management module 230) determines that the memory access count is the predetermined count, the process proceeds to step S443, in which the memory page management module 200 (or the cache management module 230) searches the translation lookaside buffer to determine whether the translation lookaside buffer 320 includes the target NVM page address. Here, in response to determining that the translation lookaside buffer 320 includes the target NVM page address, the process proceeds to step S444, in which the memory page management module 200 (or the cache management module 230) determines that the cache hit state corresponding to the target page is the hit state and the process proceeds to step S45-2. In other words, the memory page management module 200 (or the cache management module 230) identifies the target DRAM page address mapped to the target NVM page address from the translation lookaside buffer 320.

In this embodiment, the memory page management module 200 (or the cache management module 230) records a plurality of recently accessed target NVM page addresses and mapping information of a plurality of mapped target DRAM page addresses to the translation lookaside buffer 320. A used space of the translation lookaside buffer 320 is smaller than a used space of the adaptive adjusting list 310. In other words, in step S441, if the memory page management module 200 (or the cache management module 230) determines that the memory access count is the predetermined count, the memory page management module 200 (or the cache management module 230) cannot directly obtain the corresponding target DRAM page address. Instead, the memory page management module 200 (or the cache management module 230) can search the translation lookaside buffer 320 to determine whether the target NVM page address corresponding to the current access command is being accessed recently.

Accordingly, since the memory access operation has the characteristic of accessing the recently accessed memory page, the memory page management module 200 (or the cache management module 230) can shorten the time for searching the target NVM page address by searching the smaller translation lookaside buffer 320. In other words, if the memory page management 200 (or the cache management module 230) can find the target NVM page address from the translation lookaside buffer 320 (step S443→Yes), the memory page management module 200 (or the cache management module 230) can quickly find the target DRAM page address mapped to the target NVM page address (step S45-2) by utilizing the mapping information recorded by the translation lookaside buffer 320.

Conversely, if the memory page management module 200 (or the cache management module 230) cannot find the target NVM page address from the translation lookaside buffer 320 (step S433→No), the process proceeds to step S445, in which the memory page management module 200 (or the cache management module 230) searches the adaptive adjusting list 310 to determine whether the adaptive adjusting list includes the target NVM page address. Here, in response to determining that the adaptive adjusting list includes the target NVM page address (step S445→Yes), the memory page management module 200 (or the cache management module 230) determines that the cache hit state corresponding to the target page is the hit state and the process proceeds to step S45-3. In other words, the memory page management module 200 (or the cache management module 230) identifies the target DRAM page address mapped to the target NVM page address from the adaptive adjusting list 310. In response to determining that the adaptive adjusting list does not include the target NVM page address (step S445→No), the process proceeds to step S477, in which the memory page management module 200 (or the cache management module 230) determines that the cache hit state corresponding to the target page is the miss state. Next, the process proceeds to step S48.

Referring back to FIG. 4A, in response to determining that the cache hit state corresponding to the target page is the hit state, the process proceeds to step S45, in which the memory page management module 200 (or the cache management module 230) identifies the target DRAM page address mapped to the target NVM page address. The identified target DRAM page address may be used to process the access command. Implementation of step S45 may be changed according to the determination process of step S44, and details thereof have been described above, and are not described herein.

Next, in step S46, in response to the target page being grouped into the lazy list 3122 of the adaptive LRU list 312, the memory page management module 200 (or the page list management module 220) groups the target page into the FIFO list 3121 of the adaptive LRU list 312.

Specifically, after determining that the cache hit state corresponding to the target page is the hit state, the memory page management module 200 (or the page list management module 220) further checks whether the list to which the target page currently belongs is the lazy list. If so, the memory page management module 200 (or the page list management module 220) groups the target page into the FIFO list 3121 (adjusts the grouping of the target page in the hit state). Accordingly, by adjusting the grouping of the target page in the hit state from the lazy list 3122 to the FIFO list 3121, the probability that the target page is removed from the DRAM 130 is reduced. In this embodiment, the memory pages grouped into the lazy list 3122 may be deleted from the DRAM 130 (without being cached by the DRAM 130).

Figure 6:
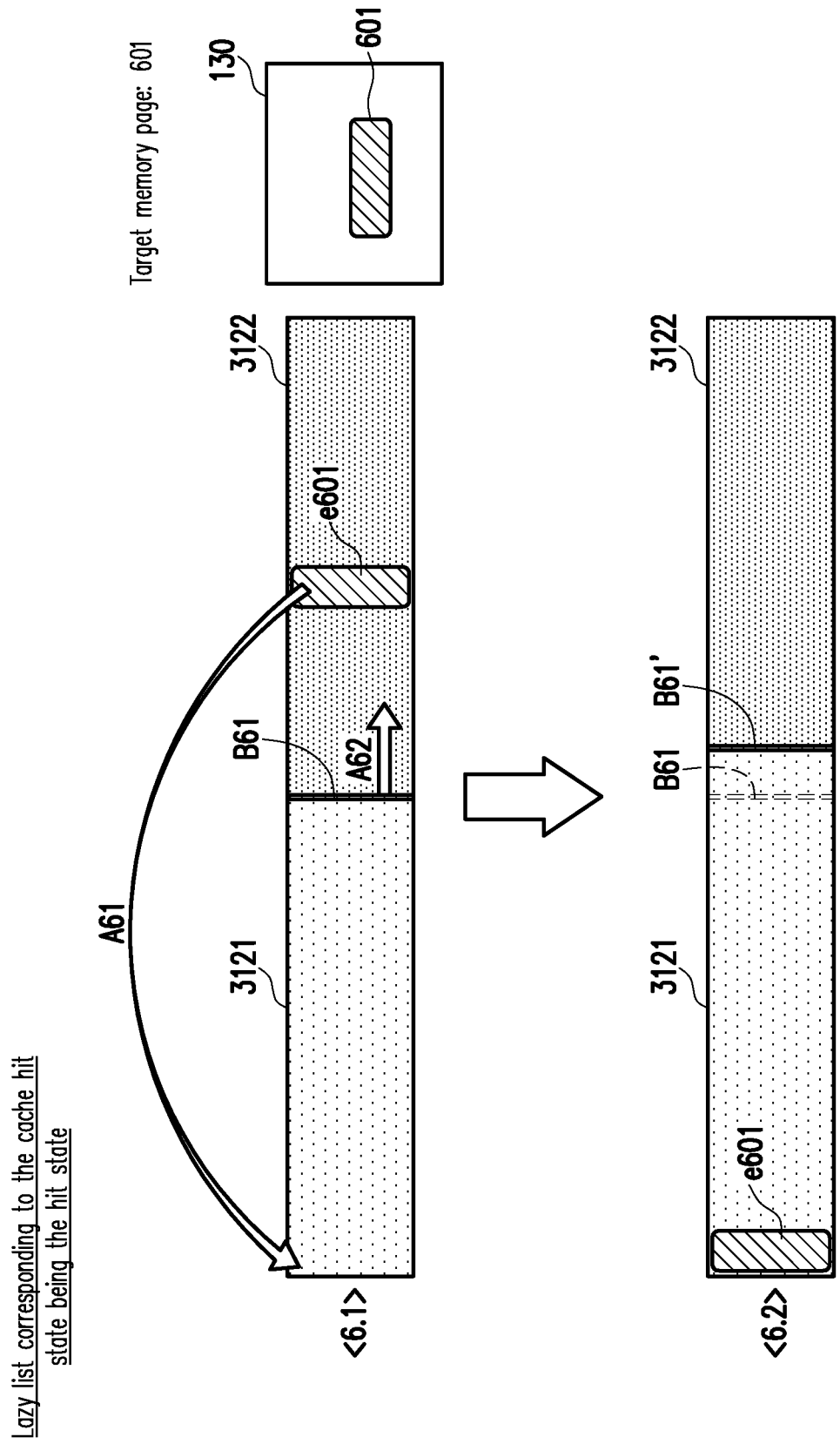
FIG. 6 is a schematic diagram illustrating a list adjustment in a lazy list corresponding to the cache hit state being the hit state according to an embodiment of the disclosure.

FIG. 6 is a schematic diagram illustrating a list adjustment in a lazy list corresponding to the cache hit state being the hit state according to an embodiment of the disclosure. Referring to FIG. 6, for instance, it is assumed that the target page in the hit state is an NVM page 601. As shown by right portion of FIG. 6, data stored by the NVM page 601 is cached in the DRAM 130. As shown by a legend <6.1>, the NVM page 601 has been grouped into the lazy list 3122, namely, an entry e601 corresponding to the NVM page 601 has been record in the lazy list 3122. In the case where the target page in the hit state is determined to be the NVM page 601, the memory page management module 200 (or the page list management module 220) moves the entry e601 from the lazy list 3122 to a front end of the FIFO list 3121 (as shown by an arrow A61). Then, the memory page management module 200 (or the page list management module 220) changes a border B61 between the FIFO list 3121 and the lazy list 3122 to a border B61' (as shown by an arrow A62). The adjusted FIFO list 3121 and the lazy list 3122 may refer to a legend <6.2> of FIG. 6.

Referring back to FIG. 4A, next, in step S47, the memory page management module 200 completes the access operation corresponding to the target page data by using the target DRAM page address according to the access command.

Specifically, the memory page management module 200 performs different access operations according to the type of the access command. For example, if the access command corresponds to the memory write operation (i.e., the access command instructs the processor 122 to write the target page data of the access command into the target page), the memory page management module 200 writes the target page data in the access command into the target DRAM page corresponding to the target DRAM page address, so as to update the data stored by the target DRAM page that has been cached by using the target page data of the access command. Next, the memory page management module 200 can respond to the central processing unit 11 that the access operation has been completed.

On the other hand, if the access command corresponds to a memory read operation (i.e., the access command instructs the processor 122 to read the target page data from the target page), the memory page management module 200 reads the target page data from the target DRAM page corresponding to the target DRAM page address, transmits the read target page data to the central processing unit 11, and responds to the central processing unit 11 that the access operation has been completed.

Referring back to step S44, as described above, if the cache hit state corresponding to the target page is the miss state, the process proceeds to step S48. In step S48, the target page data corresponding to the target page is stored into the target DRAM page of the DRAM, the target DRAM page address of the target DRAM page is mapped to the target NVM page address, and the target page is grouped into the adaptive LRU list. Details regarding this step are described below with reference to FIG. 4C.

Figure 4C:
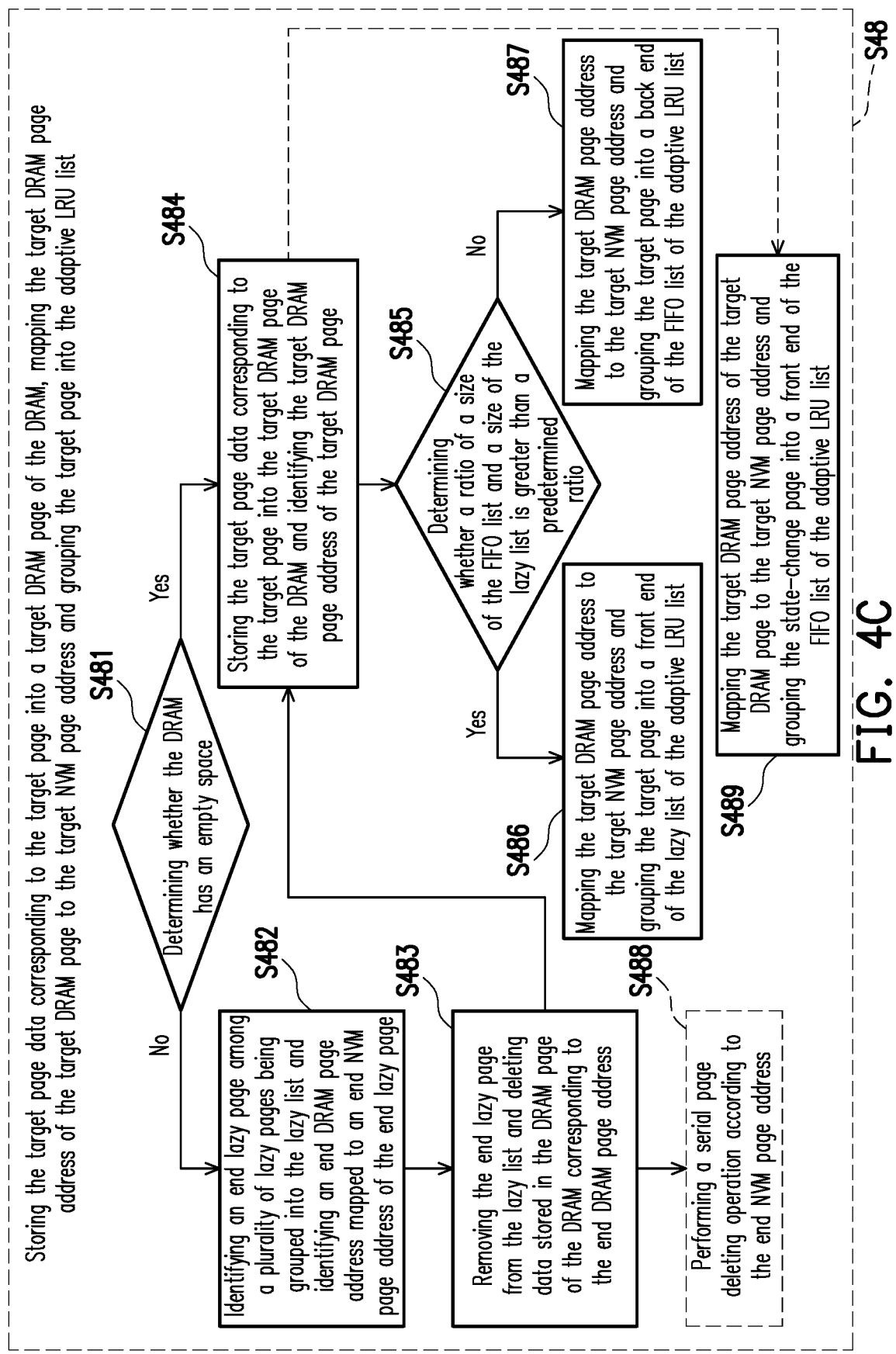
FIG. 4C is a flowchart illustrating step S48 of FIG. 4A according to an embodiment of the disclosure.

FIG. 4C is a flowchart illustrating step S48 of FIG. 4A according to an embodiment of the disclosure. With reference to FIG. 4C, in step S481, the memory page management module 200 (or the cache management module 230) determines whether the DRAM 130 has an empty space. Specifically, if the cache hit state corresponding to the target page is the miss state, the memory page management module 200 (or the cache management module 230) starts to execute a cache operation corresponding to the target page, so as to cache the target page data in the DRAM 130.

Accordingly, the memory page management module 200 (or the cache management module 230) first executes step S481 to confirm whether the DRAM 130 has the empty space for storing the target page data.

In response to the DRAM 130 not having the empty space (step S481→No), the process proceeds to step S482, in which the memory page management module 200 (or the cache management module 230) identifies an end lazy page among a plurality of lazy pages being grouped into the lazy list, and identifies an end DRAM page address mapped to an end NVM page address of the end lazy page. Next, the memory page management module 200 (or the cache management module 230) removes the end lazy page from the lazy list, and deletes data stored in the DRAM page of the DRAM corresponding to the DRAM page address. Details regarding this step are described below with reference to FIG. 8.

Figure 8:
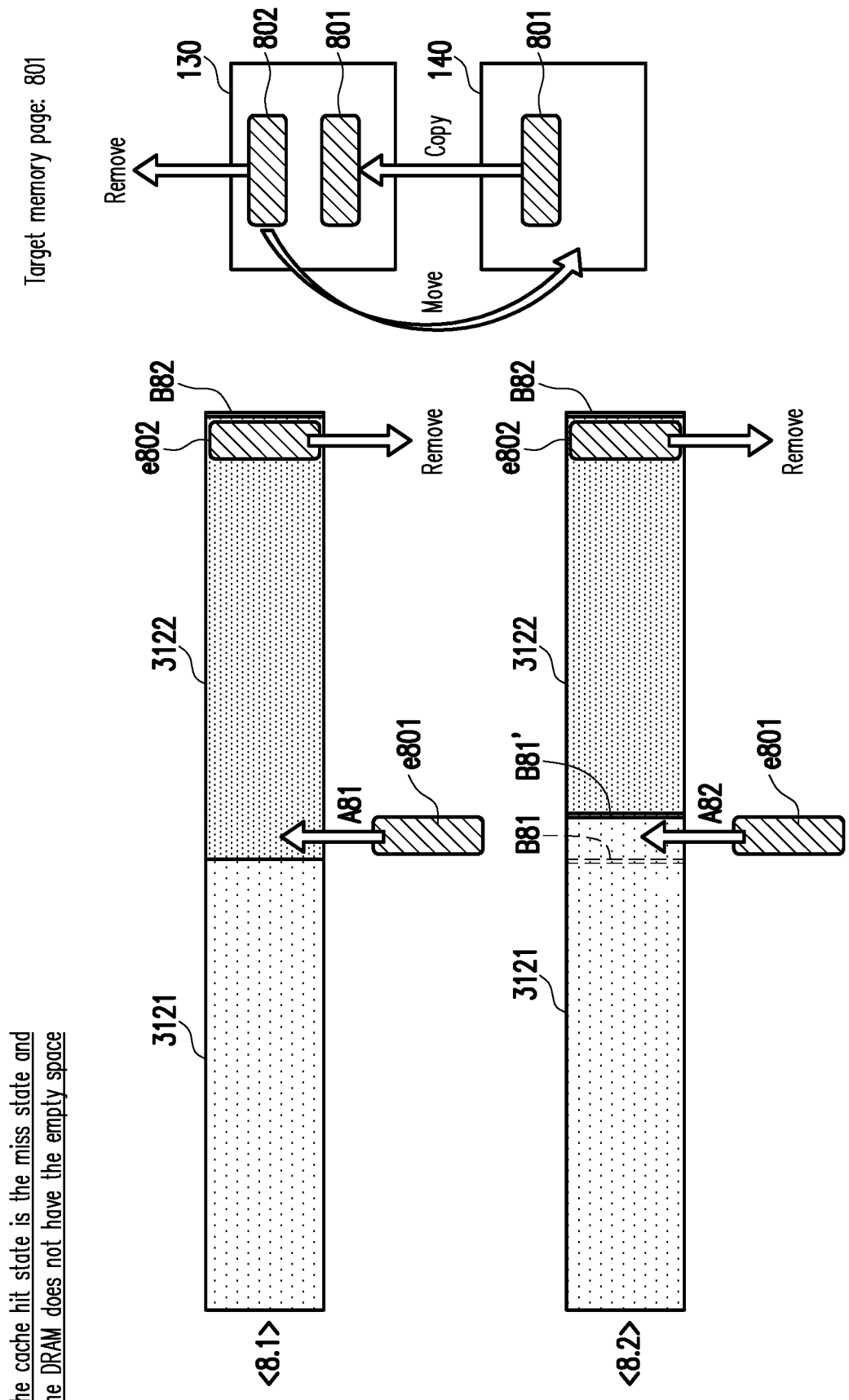
FIG. 8 is a schematic diagram illustrating a list adjustment corresponding to the cache hit state being the miss state and the DRAM not having the empty space according to an embodiment of the disclosure.

FIG. 8 is a schematic diagram illustrating a list adjustment corresponding to the cache hit state being the miss state and the DRAM not having the empty space according to an embodiment of the disclosure. With reference to FIG. 8, it is assumed that the last entry in a lazy list 8122 is an entry e802, and the entry e802 corresponds to an NVM page 802. That is to say, the NVM page 802 is currently being grouped into the end of the lazy list, and the NVM page 802 is grouped as the end lazy page among a plurality of NVM pages (a.k.a. lazy pages) in the lazy list 3122. In addition, it is assumed that the target page is an NVM page 801, and the cache hit state corresponding to the NVM page 801 is the miss state.

In this example, the memory page management module 200 (or the cache management module 230) removes the entry e802 from the lazy list 3122, and deletes data corresponding to the NVM page 802 cached in the DRAM 130 (if the data cached in the DRAM 130 is identical to data originally stored in the NVM 140) or moves the data corresponding to the NVM page 802 cached in the DRAM 130 back to the NVM 140 (if the data cached in the data is different from the data originally stored in the NVM 140). In this way, the DRAM 130 may be cleared of one empty space for storing the data of the NVM page 801, and the adaptive LRU list 312 may also be cleared of one empty space for recording one entry.

After the DRAM 130 and the adaptive LRU list 312 are cleared of the empty spaces, the memory page management module 200 (or the cache management module 230) stores the target page data corresponding to the target page to the target DRAM page of the DRAM and identifies the target DRAM page address of the target DRAM page. That is to say, the memory page management module 200 (or the cache management module 230) uses the DRAM page corresponding to the empty space as the target DRAM page, and writes the target page data into the target DRAM page.

Specifically, if the access command corresponds to the memory write operation (i.e., the access command instructs the processor 122 to write the target page data of the access command into the target page), the memory page management module 200 (or the cache management module 230) writes the target page data in the access command into the target DRAM page 801 of the DRAM 130, and identifies the DRAM page address of the DRAM page 801 as the target DRAM page address.

On the other hand, if the access command corresponds to the memory read operation (i.e., the access command instructs the processor 122 to read the target page data of the access command from the target page), as shown by the right portion of FIG. 8, the memory page management module 200 (or the cache management module 230) first copies the data of the NVM page 801 from the NVM 140 to the DRAM page 801 in the DRAM 130, identifies the DRAM page address of the DRAM page 801 as the target DRAM page address, reads the copied target page address from the target DRAM page 801 corresponding to the target DRAM page address, and transmits the read target page data to the central processing unit 11.

After completing step S484, in step S485, the memory page management module 200 (or the page list management module 220) determines whether a ratio of a size of the FIFO list and a size of the lazy list is greater than a predetermined ratio.

In response to the ratio of the size of the FIFO list and the size of the lazy list being greater than the predetermined ratio (step S485→Yes), the process proceeds to step S486, in which the memory page management module 200 (or the page list management module 220) maps the target DRAM page address to the target NVM page address, and groups the target page to a front end of the lazy list of the adaptive LRU list.

Further, in response to the ratio of the size of the FIFO list and the size of the lazy list not being greater than the predetermined ratio (step S485→No), the process proceeds to step S487, in which the memory page management module 200 (or the page list management module 220) maps the target DRAM page address to the target NVM page address, and groups the target page to a back end of the FIFO list of the adaptive LRU list.

Specifically, the memory page management module 200 (or the page list management module 220) records the entry e801 for setting the target DRAM page address to be mapped to the target NVM page address, and determines whether to record the entry e801 in the lazy list 3122 (as shown by a legend <8.1> of FIG. 8) or in the FIFO list 3121 (as shown by a legend <8.2> of FIG. 8) according to the ratio and the predetermined ratio.

More specifically, if the ratio is greater than the predetermined ratio, it means that the size of the FIFO list 3121 is greater than an expected size so that the memory page management module 200 (or the page list management module 220) records the newly-added entry e801 at the front end of the lazy list 3122 (as shown by an arrow A81) to prevent the size of FIFO list 3121 from increasing. Conversely, if the ratio is not greater than the predetermined ratio, it means that the size of the FIFO list 3121 is not greater than the expected size so that the memory page management module 200 (or the page list management module 220) can adjust a border B81 to a border B81' to continue recording the newly-added entry e801 in the FIFO list 3121 (as shown by an arrow A82).

However, in another embodiment, step S48 does not include steps S485, S486 and S487, and the process proceeds to step S489 from step S484. In step S489, the memory page management module 200 (or the page list management module 220) maps the target DRAM page address to the target NVM page address, and groups the target page to a front end of the FIFO list of the adaptive LRU list. In other words, in said another embodiment, the memory page management module 200 (or the page list management module 220) does not determine a location where the entry e801 is recorded according to the ratio of the sizes of the FIFO list 3121 and the lazy list 3122. Instead, the memory page management module 200 (or the page list management module 220) directly records the entry e801 at a front end of the FIFO list 3121.

Referring back to FIG. 4C, after completing step S481, in response to the DRAM 130 having the empty space (step S481→Yes), the process proceeds to step S484. That is to say, the memory page management module 200 (or the cache management module 230) does not need to execute step S482 and step S483, but continues to execute subsequent steps S485, S486 and S487.

Figure 7:
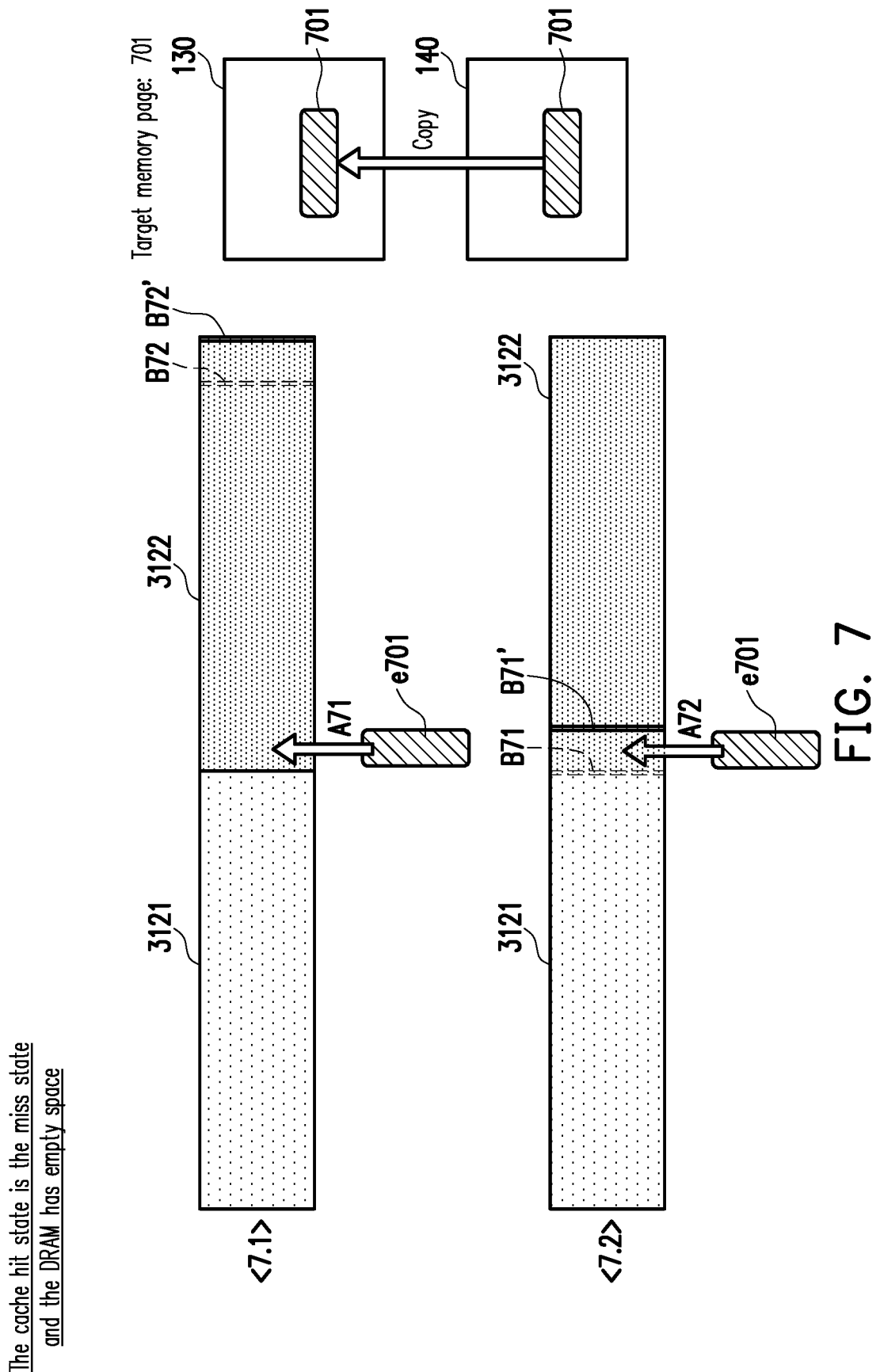
FIG. 7 is a schematic diagram illustrating a list adjustment corresponding to the cache hit state being the miss state and the DRAM having empty space according to an embodiment of the disclosure.

FIG. 7 is a schematic diagram illustrating a list adjustment corresponding to the cache hit state being the miss state and the DRAM having the empty space according to an embodiment of the disclosure. With reference to FIG. 7, it is assumed that the target page is an NVM page 701, and the corresponding cache hit state is the miss state and the DRAM has the empty space. While executing step S484, since the DRAM has the empty space that can be directly used to store the target page data, the memory page management module 200 (or the cache management module 230) can copy data of the NVM page 701 in the NVM 140 to the target DRAM page of the DRAM 130, and identifies the target DRAM page address corresponding to the target DRAM page.

For example, if the access command corresponds to the memory write operation (i.e., the access command instructs the processor 122 to write the target page data of the access command into the target page), the memory page management module 200 (or the cache management module 230) writes the target page data in the access command into the target DRAM page 701 of the DRAM 130, and identifies the DRAM page address of the DRAM page 701 as the target DRAM page address.

On the other hand, if the access command corresponds to the memory read operation (i.e., the access command instructs the processor 122 to read the target page data of the access command from the target page), as shown by the right portion of FIG. 7, the memory page management module 200 (or the cache management module 230) first copies the data of the NVM page 701 from the NVM 140 to the DRAM page 701 of the DRAM 130, identifies the DRAM page address of the DRAM page 701 as the target DRAM page address, reads the copied target page address from the target DRAM page 701 corresponding to the target DRAM page address, and transmits the read target page data to the central processing unit 11. The memory page management module 200 (or the page list management module 220) generates an entry e701 for recording a mapping relation of the target DRAM page address and the target NVM page address.

Next, in step S485, the memory page management 200 (or the page list management module 220) determines whether to store the entry e701 into the lazy list 3122 or the FIFO list 3121 according to whether the ratio of the size of the FIFO list and the size of the lazy list is greater than the predetermined ratio. Details of this step are similar to those described for FIG. 8, which are not repeated hereinafter. Here, since the DRAM still has the empty space, entries can continuously be added to the lazy list 3122 of the adaptive LRU list 312. Then, the memory page management module 200 (or the page list management module 220) can adjust a border B72 to a border B72' to change the size of the lazy list 3122 so the entry e701 can be stored into the lazy list 3122.

It is worth noting that, in another embodiment, in order to clear the DRAM 130 for more empty spaces, after completing step S483, the memory page management module 200 further executes step S488. In step S488, the memory page management module 200 performs a serial page deleting operation according to the end NVM page address. This step is described with reference to FIG. 4D and FIG. 9.

Figure 4D:
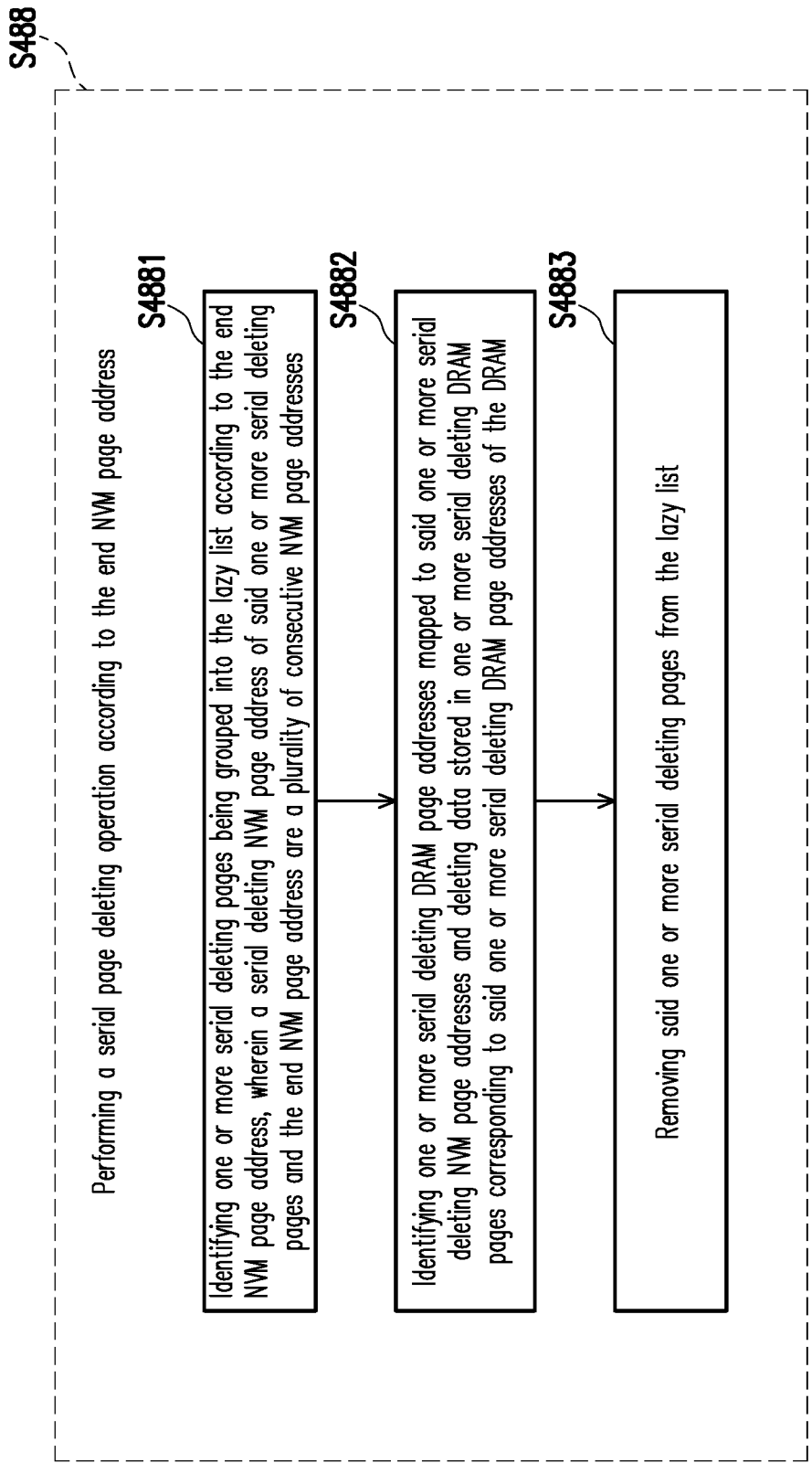
FIG. 4D is a flowchart illustrating step S488 of FIG. 4B according to an embodiment of the disclosure.
Figure 9:
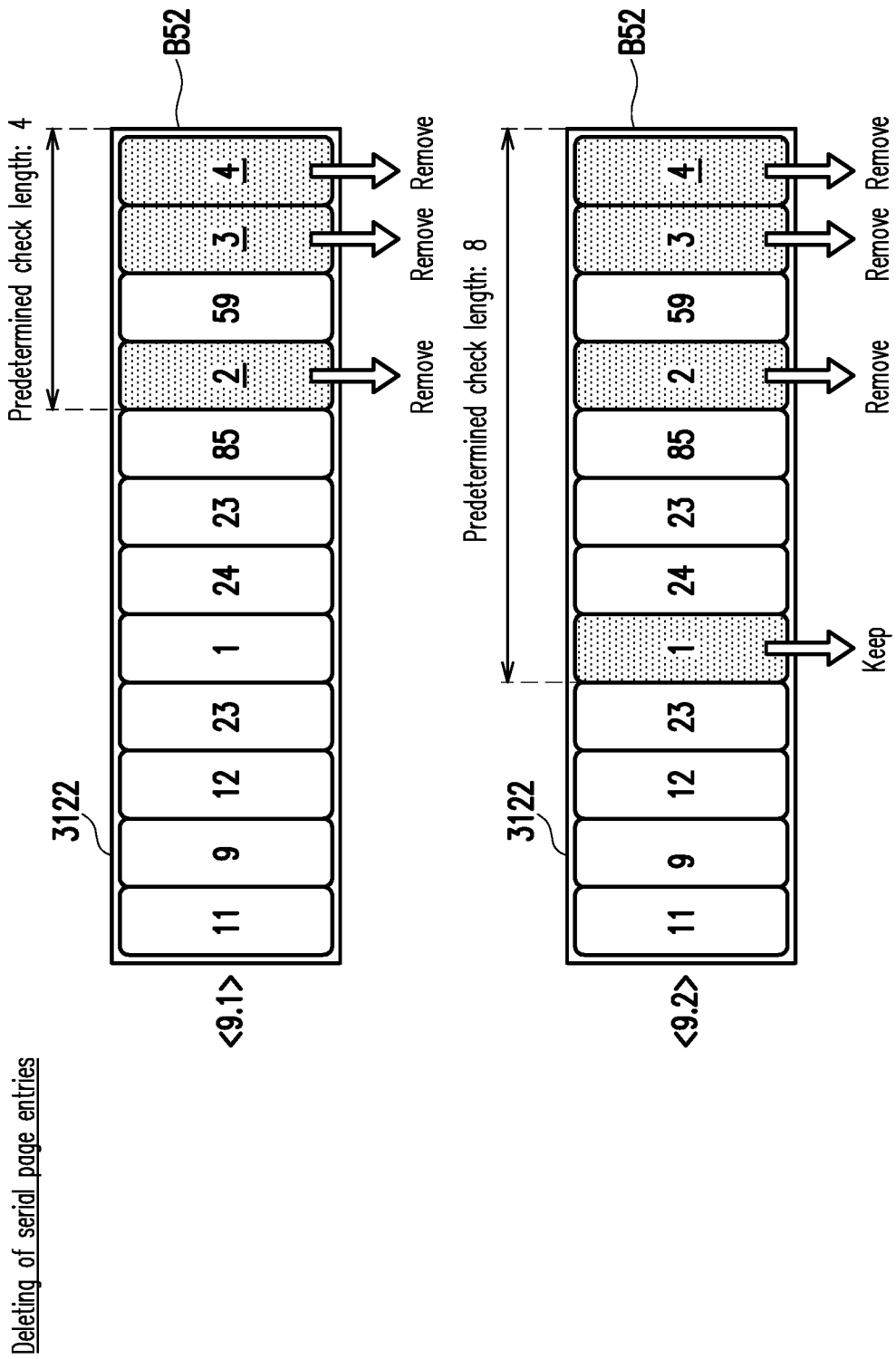
FIG. 9 is a schematic diagram illustrating a serial page deleting operation according to an embodiment of the disclosure.

FIG. 4D is a flowchart illustrating step S488 of FIG. 4B according to an embodiment of the disclosure. FIG. 9 is a schematic diagram illustrating a serial page deleting operation according to an embodiment of the disclosure. With reference to FIG. 4D, in the serial page deleting operation, in step S4881, the memory page management module 200 (or the page list management module 220) identifies one or more serial deleting pages being grouped into the lazy list according to the end NVM page address. Here, a serial deleting NVM page address of said one or more serial deleting pages and the end NVM page address are a plurality of consecutive NVM page addresses.

For instance, with reference to a legend <9.1> of FIG. 9, it is assumed that the NVM page address corresponding to the lazy pages being grouped into the lazy list 3122 are "11, 9, 12, 23, 1, 24, 23, 85, 2, 59, 3 and 4". Among them, the one corresponding to the NVM page address "4" is the last NVM page address (a.k.a. the end NVM page address or an end lazy page address), the end NVM page address is grouped as the memory page address of the end lazy page of the lazy list 3122. In this embodiment, the memory page management module 200 (or the page list management module 220) uses a predetermined check length (e.g., 4) to check a number of the NVM page addresses equal to the predetermined check length starting with the end NVM page address onward, so as to determine whether there is one or more NVM page addresses in the lazy list 3122 arranged before the end NVM page address that can constitute the consecutive page addresses together with the end NVM page address. In the example of the legend <9.1>, based on the predetermined check length "4", from the end NVM page address "4" and the previous three NVM page addresses before the end NVM page address "4" (which are four NVM page addresses in total), the memory page management module 220 (or the page list management module 220) finds that the end NVM page address "4" and the NVM page addresses "2" and "3" can constitute the consecutive NVM page addresses. Therefore, the memory page management module 200 (or the page list management module 220) sets the NVM page addresses "2" and "3" as the serial deleting NVM page addresses, and serially deletes two serial deleting pages corresponding to the serial deleting NVM page addresses "2" and "3".

In the example of a legend <9.2>, based on the predetermined check length "8", from the end NVM page address "4" and the previous seven NVM page addresses before the end NVM page address "4" (which are eight NVM page addresses in total), the memory page management module 220 (or the page list management module 220) finds that the end NVM page address "4" and the NVM page addresses "1", "2" and "3" can constitute the consecutive NVM page addresses. Therefore, the memory page management module 200 (or the page list management module 220) sets the NVM page addresses "1", "2" and "3" as the serial deleting NVM page addresses, and serially deletes three serial deleting pages corresponding to the serial deleting NVM page addresses "1", "2" and "3".

Next, in step S4882, the memory page management module 200 (or the page list management module 220) identifies one or more serial deleting DRAM page addresses mapped to said one or more serial deleting NVM page addresses, and the memory page management module 200 (or the page list management module 220) deletes data stored in the one or more serial deleting DRAM pages corresponding to said one or more serial deleting DRAM page addresses from the DRAM. For instance, in correspondence to the legend <9.1>, the memory page management module 200 (or the page list management module 220) identifies a plurality of serial deleting DRAM page addresses mapped to the serial deleting NVM page addresses "2" and "3" through a plurality of entries corresponding to the serial deleting NVM page addresses "2" and "3" in the lazy list 3122. Next, according to the identified serial deleting DRAM page addresses, the memory page management module 200 (or the cache management module 230) deletes data stored in the one or more serial deleting DRAM pages corresponding to said one or more serial deleting DRAM page addresses from the DRAM, and may delete the cached page data corresponding to the serial deleting NVM page addresses "2" and "3" in the DRAM 130 based on the identified plurality of serial deleting DRAM page addresses or move the cached page data corresponding to the serial deleting NVM page addresses "2" and "3" in the DRAM 130 to the NVM 140.

Next, when the cached page data is removed from the DRAM, in step S4883, the memory page management module 200 (or the page list management module 220) removes said one or more serial deleting pages from the lazy list 3122. For instance, in correspondence to the legend <9.1>, the memory page management module 200 (or the page list management module 220) removes the entries corresponding to the serial deleting NVM page addresses "2" and "3" from the lazy list 3122. As a result, the serial page deleting operation is completed.

The spirit of the serial page deleting operation described above is that, there is a data access correlation for the page addresses between the end lazy page originally to be removed and the other lazy pages consecutive to the end lazy page. In other words, the page addresses belonging to the consecutive NVM pages are likely to have the same data access probability/frequency. Accordingly, since the end NVM page in the lazy list to be removed is the page most unlikely being accessed again, the other page addresses consecutive to the end NVM page addresses also be removed together (by clearing the corresponding cache from the DRAM 130).

In another embodiment, the number of the serial deleting pages deleted in the serial page deleting operation may also be limited by presetting a deleting count threshold. That is to say, the number of the serial deleting pages deleted in the serial page deleting operation is a value of the deleting count threshold minus one. In this way, it can be guaranteed that the total number of deleted memory pages does not exceed the deleting count threshold each time when the DRAM space is cleared up. For instance, in correspondence to the legend <9.2>, since the deleting count threshold is 3, even if the memory page management module 200 (or the page list management module 200) finds three NVM page addresses "1", "2" and "3" consecutive to the end NVM page address with the predetermined check length "8", the NVM page corresponding to the NVM page address "1" is still kept, so cache of three NVM pages total corresponding to the NVM page address "4", "2" and "3" are cleared and removed from the lazy page.

In summary, the memory controller and the memory page management method provided by the disclosure can receive the state-change notification corresponding to the state-change page from the operating system executed by the host system, and accurately determine the group to which the cached memory page belongs according to the state-change notification, so as to move the cached memory page from the current page list to another page list (e.g., the keep list) that can keep the cache state and enhance the cache accuracy for cached memory page. In addition, the cached memory page may also be further grouped by determining whether the cache hit state of the target page corresponding to the access command is the hit state or the miss state, so as to allow the less often used memory pages to have higher chance of being removed from the cache of the DRAM and allow the more often used memory pages to have lower chance of being removed from the cache of the DRAM. In this way, the memory controller and the memory page management method provided by the disclosure can allow the NVDIMM device to provide high memory management cache efficiency with very few management resources used to fully utilize the quick access performance of the DRAM. As a result, the NVDIMM device can provide the data access speed close to that of the DRAM, which improves the defects of the conventional NVDIMM device.

Although the disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A memory controller, adapted for controlling a non-volatile dual in-line memory module (NVDIMM) device of a host system, wherein the NVDIMM device comprises the memory controller, a dynamic random access memory (DRAM) and a non-volatile memory (NVM), wherein the DRAM has a plurality of DRAM pages, the NVM has a plurality of NVM pages, and the memory controller comprises:

an NVDIMM interface, configured to be coupled to a central processing unit of the host system, wherein the central processing unit of the host system is configured to access the NVM pages of the NVM and execute an operating system of the host system;

a static random access memory (SRAM), configured to store data; and a processor, coupled to the DRAM, the NVM, the NVDIMM interface and the SRAM, wherein the processor of the memory controller is configured to carry out a memory page management operation by accessing the NVM and executing a memory page management module disposed in the NVM, wherein the memory page management module is configured to receive a state-change notification corresponding to a state-change page from the host system and configured to group the state-change page, from a list to which the state-change page belongs, into a keep list located at a front end of an adaptive adjusting list or into an adaptive least recently used (LRU) list located at a back end of the adaptive adjusting list according to the state-change notification, wherein the state-change notification is configured to indicate that an access state of the state-change page is changed to a frequently-accessed state or changed to an infrequently-accessed state monitored by the operating system, wherein the memory page management module is further configured to receive an access command from the central processing unit of the host system, wherein the access command instructs an access operation to be performed to target page data corresponding to a target page, wherein the memory page management module is further configured to identify the target page and a target NVM page address corresponding to the target page according to the access command, in response to determining that a cache hit state corresponding to the target page is a hit state, the memory page management module is further configured to identify a target DRAM page address mapped to the target NVM page address, wherein in response to the hit state and the target page being grouped into a lazy list located at a back end of the adaptive LRU list, the memory page management module is further configured to move the target page from the lazy list located at the back end of the adaptive LRU list to a first in first out (FIFO) list located at a front end of the adaptive LRU list, wherein the FIFO list has higher data access frequency with respect to the lazy list, in response to determining that the cache hit state corresponding to the target page is a miss state, the memory page management module is further configured to store the target page data corresponding to the target page into a target DRAM page of the DRAM, map the target DRAM page address of the target DRAM page to the target NVM page address and group the target page into the adaptive LRU list, and wherein the memory page management module is further configured to complete the access operation corresponding to the target page data by using the target DRAM page address according to the access command.

2. The memory controller according to claim 1, wherein the memory page management module performs a memory initialization operation corresponding to the NVDIMM device to install an operating system notification module to the operating system, wherein the central processing unit executes the operating system notification module,
wherein the operating system notification module is configured to send the state-change notification to the memory page management module, and the state-change notification comprises a promotion notification and a demotion notification,
wherein when the operating system changes the state of the state-change page to the active state, the operating system notification module sends the promotion notification to the memory page management module, and
wherein when the operating system changes the state of the state-change page to the inactive state, the operating system notification module sends the demotion notification to the memory page management module.

3. The memory controller according to claim 2, wherein in response to the state-change notification being the demotion notification and the state-change page being grouped into the keep list, the memory page management module groups the state-change page into a front end of the FIFO list of the adaptive LRU list, and
in response to the state-change notification being the promotion notification and the state-change page being grouped into the adaptive LRU list, the memory page management module groups the state-change page into the keep list.

4. The memory controller according to claim 1, wherein in response to the DRAM having an empty space, the memory page management module stores the target page data corresponding to the target page into the target DRAM page of the DRAM, and identifies the target DRAM page address of the target DRAM page.

5. The memory controller according to claim 4, wherein the memory page management module further maps the target DRAM page address to the target NVM page address and groups the target page into a front end of the FIFO list of the adaptive LRU list.

6. The memory controller according to claim 4, wherein in response to a ratio of a size of the FIFO list and a size of the lazy list being greater than a predetermined ratio, the memory page management module maps the target DRAM page address to the target NVM page address and groups the target page into a front end of the lazy list of the adaptive LRU list,
wherein in response to the ratio of the size of the FIFO list and the size of the lazy list not being greater than the predetermined ratio, the memory page management module maps the target DRAM page address to the target NVM page address and groups the target page into a back end of the FIFO list of the adaptive LRU list.

7. The memory controller according to claim 1, wherein in response to the DRAM not having an empty space,
the memory page management module identifies an end lazy page among a plurality of lazy pages being grouped into the lazy list and identifies an end DRAM page address mapped to an end NVM page address of the end lazy page,
wherein the memory page management module removes the end lazy page from the lazy list and deletes data stored in a DRAM page of the DRAM corresponding to the end DRAM page address, before operations of storing the target page data corresponding to the target page into the target DRAM page of the DRAM and identifying the target DRAM page address of the target DRAM page.

8. The memory controller according to claim 7, wherein in response to that the memory page management module removes the end lazy page from the lazy list, and after deleting the data stored in a DRAM page of the DRAM corresponding to the end DRAM page address is completed, the memory page management module performs a serial page deleting operation according to the end NVM page address.

9. The memory controller according to claim 8, wherein in the serial page deleting operation, the memory page management module identifies one or more serial deleting pages being grouped into the lazy list according to the end NVM page address, wherein a serial deleting NVM page address of said one or more serial deleting pages and the end NVM page address are a plurality of consecutive NVM page addresses,
wherein the memory page management module identifies one or more serial deleting DRAM page addresses mapped to said one or more serial deleting NVM page addresses and deletes data stored in one or more serial deleting DRAM pages corresponding to said one or more serial deleting DRAM page addresses of the DRAM, and
wherein the memory page management module removes said one or more serial deleting pages from the lazy list.

10. The memory controller according to claim 1, wherein in response to determining that a memory access count corresponding to the access command is not a predetermined count, the memory page management module determines that the cache hit state corresponding to the target page is the hit state and identifies a previous DRAM page address corresponding to a previous access command as the target DRAM page address mapped to the target NVM page address, and
wherein in response to determining that the memory access count corresponding to the access command is the predetermined count, the memory page management module searches a translation lookaside buffer,
in response to that the translation lookaside buffer includes the target NVM page address, the memory page management module determines that the cache hit state corresponding to the target page is the hit state and identifies the target DRAM page address mapped to the target NVM page address from the translation lookaside buffer,
in response to that the translation lookaside buffer does not include the target NVM page address, the memory page management module searches the adaptive adjusting list, wherein in response to that the adaptive adjusting list includes the target NVM page address, the memory page management module determines that the cache hit state corresponding to the target page is the hit state and identifies the target DRAM page address mapped to the target NVM page address from the adaptive adjusting list, wherein in response to that the adaptive adjusting list does not include the target NVM page address, the memory page management module determines that the cache hit state corresponding to the target page is the miss state.

11. A memory page management method, adapted for controlling a memory controller of a non-volatile dual In-line memory module (NVDIMM) device of a host system, wherein the NVDIMM device comprises the memory controller, a dynamic random access memory (DRAM) and a non-volatile memory (NVM), wherein the DRAM has a plurality of DRAM pages, the NVM has a plurality of NVM pages, and the memory page management method comprises:

configuring a processor of the memory controller to access the NVM and execute a memory page management module disposed in the NVM to carry out steps comprises:

receiving a state-change notification corresponding to a state-change page from the host system and grouping the state-change page, from a list to which the state-change page belongs, into a keep list located at a front end of an adaptive adjusting list or into an adaptive least recently used (LRU) list located at a back end of the adaptive adjusting list according to the state-change notification, wherein a central processing unit of the host system executes an operating system of the host system, wherein the state-change notification is configured to indicate that an access state of the state-change page is changed to a frequently-accessed state or changed to an infrequently-accessed state monitored by the operating system;

receiving an access command from the central processing unit of the host system, wherein the access command instructs an access operation to be performed to target page data corresponding to a target page;

identifying the target page and a target NVM page address corresponding to the target page according to the access command, in response to determining that a cache hit state corresponding to the target page is a hit state, identifying a target DRAM page address mapped to the target NVM page address;

in response to the hit state and the target page being grouped into a lazy list located at a back end of the adaptive LRU list, further moving the target page from the lazy list located at the back end of the adaptive LRU list to a first in first out (FIFO) list located at a front end of the adaptive LRU list, wherein the FIFO list has higher data access frequency with respect to the lazy list, and in response to determining that the cache hit state corresponding to the target page is a miss state, storing the target page data corresponding to the target page into a target DRAM page of the DRAM, mapping the target DRAM page address of the target DRAM page to the target NVM page address and grouping the target page into the adaptive LRU list; and completing the access operation corresponding to the target page data by using the target DRAM page address according to the access command.

12. The memory page management method according to claim 11, wherein a memory initialization operation corresponding to the NVDIMM device is further performed to install an operating system notification module to the operating system, wherein the central processing unit executes the operating system notification module, wherein the operating system notification module is configured to send the state-change notification to the memory page management module, and the state-change notification comprises a promotion notification and a demotion notification, and wherein when the state of the state-change page is changed to the active state by the operating system, the promotion notification is sent to the memory page management module by the operating system notification module, and when the state of the state-change page is changed to the inactive state by the operating system, the demotion notification is sent to the memory page management module by the operating system notification module.

13. The memory page management method according to claim 12, wherein in response to the state-change notification being the demotion notification and the state-change page being grouped into the keep list, grouping the state-change page into a front end of the FIFO list of the adaptive LRU list, and in response to the state-change notification being the promotion notification and the state-change page being grouped into the adaptive LRU list, grouping the state-change page into the keep list.

14. The memory page management method according to claim 11, wherein in response to the DRAM having an empty space, storing the target page data corresponding to the target page into the target DRAM page of the DRAM and identifying the target DRAM page address of the target DRAM page.

15. The memory page management method according to claim 14, wherein further mapping the target DRAM page address to the target NVM page address by the memory page management module and grouping the target page into a front end of the FIFO list of the adaptive LRU list.

16. The memory page management method according to claim 14, wherein in response to a ratio of a size of the FIFO list and a size of the lazy list being greater than a predetermined ratio, mapping the target DRAM page address to the target NVM page address and grouping the target page into a front end of the lazy list of the adaptive LRU list, and in response to the ratio of the size of the FIFO list and the size of the lazy list not being greater than the predetermined ratio, mapping the target DRAM page address to the target NVM page address and grouping the target page into a back end of the FIFO list of the adaptive LRU list.

17. The memory page management method according to claim 11, wherein in response to the DRAM not having an empty space, identifying an end lazy page among a plurality of lazy pages being grouped into the lazy list and identifying an end DRAM page address mapped to an end NVM page address of the end lazy page; and removing the end lazy page from the lazy list and deleting data stored in a DRAM page of the DRAM corresponding to the end DRAM page address, before storing the target page data corresponding to the target page into the target DRAM page of the DRAM and identifying the target DRAM page address of the target DRAM page.

18. The memory page management method according to claim 17, wherein in response to removing the end lazy page from the lazy list by the memory page management module and after deleting the data stored in a DRAM page of the DRAM corresponding to the end DRAM page address is completed, performing a serial page deleting operation according to the end NVM page address.

19. The memory page management method according to claim 18, wherein the serial page deleting operation comprises:

identifying one or more serial deleting pages being grouped into the lazy list according to the end NVM page address, wherein a serial deleting NVM page address of said one or more serial deleting pages and the end NVM page address are a plurality of consecutive NVM page addresses;

identifying one or more serial deleting DRAM page addresses mapped to said one or more serial deleting NVM page addresses and deleting data stored in one or more serial deleting DRAM pages corresponding to said one or more serial deleting DRAM page addresses of the DRAM; and removing said one or more serial deleting pages from the lazy list.

20. The memory page management method according to claim wherein in response to determining that a memory access count corresponding to the access command is not a predetermined count, determining that the cache hit state corresponding to the target page is the hit state and the step of identifying the target DRAM page address mapped to the target NVM page comprising directly identifying a previous DRAM page address corresponding to a previous access command as the target DRAM page address mapped to the target NVM page address; and in response to determining that the memory access count corresponding to the access command is the predetermined count, searching a translation lookaside buffer, in response to that the translation lookaside buffer includes the target NVM page address, determining that the cache hit state corresponding to the target page is the hit state and identifying the target DRAM page address mapped to the target NVM page address from the translation lookaside buffer by the memory page management module; and in response to that the translation lookaside buffer does not include the target NVM page address, searching the adaptive adjusting list, in response to that the adaptive adjusting list includes the target NVM page address, determining that the cache hit state corresponding to the target page is the hit state and identifying the target DRAM page address mapped to the target NVM page address from the adaptive adjusting list; and in response to that the adaptive adjusting list includes the target NVM page address, determining that the cache hit state corresponding to the target page is the miss state.

* * * * *